United States Patent
Cheng (12)

(10) Patent No.: US 10,114,887 B1
(45) Date of Patent: Oct. 30, 2018

(54) GENERATING A SET OF REPRESENTATIVE ITEMS USING A DYNAMIC SELECTION STRATEGY

(71) Applicant: Amazon Technologies, Inc., Seattle, WA (US)

(72) Inventor: Weiwei Cheng, Berlin (DE)

(73) Assignee: Amazon Technologies, Inc., Seattle, WA (US)

(*) Notice: Subject to any disclaimer, the term of this patent is extended or adjusted under 35 U.S.C. 154(b) by 234 days.

(21) Appl. No.: 15/162,437

(22) Filed: May 23, 2016

(51) Int. Cl.
  *G06F 17/30* (2006.01)
  *G06F 3/0484* (2013.01)

(52) U.S. Cl.
  CPC .... *G06F 17/30601* (2013.01); *G06F 3/04842* (2013.01); *G06F 17/30867* (2013.01)

(58) Field of Classification Search
  CPC ......... G06F 17/30601; G06F 17/30867; G06F 17/30
  USPC .................................................. 707/600–899
  See application file for complete search history.

(56) References Cited

U.S. PATENT DOCUMENTS

| | | | |
|---|---|---|---|
| 8,214,373 B1* | 7/2012 | Bakir | G06F 17/30864 707/748 |
| 2009/0089273 A1 | 4/2009 | Hicks | |
| 2009/0327163 A1 | 12/2009 | Swan et al. | |
| 2014/0089144 A1 | 3/2014 | Li et al. | |

* cited by examiner

Primary Examiner — Isaac M Woo
(74) Attorney, Agent, or Firm — Knobbe, Martens, Olson & Bear, LLP

(57) ABSTRACT

Systems and methods are directed to a computing device for dynamically selecting a subset of representative items from a set of items. The computing device may determine characteristics regarding the set of reviews. Based on these characteristics, the computing device may determine whether to utilize a maximum-set-coverage selection strategy or a clustering-selection strategy to select the representative set of reviews. Further, the computing device may monitor for change in the characteristics of the set of reviews (e.g., the addition or deletion of a review or the change of a preexisting review) and may make a subsequent determination regarding the selection strategy to use to select a set of representative reviews based at least in part on the changed characteristics.

21 Claims, 10 Drawing Sheets

| Element | Review 1 | Review 2 | Review 3 | Review 4 | Review 5 | Review 6 | Review 7 |
|---|---|---|---|---|---|---|---|
| love | 1 | 1 | 0 | 0 | 0 | 0 | 0 |
| *Feature #1* | 1 | 1 | 0 | 0 | 0 | 0 | 0 |
| *Trait #1* | 1 | 1 | 0 | 0 | 0 | 0 | 0 |
| awesome | 1 | 0 | 0 | 0 | 0 | 0 | 0 |
| shipping | 0 | 0 | 1 | 1 | 0 | 0 | 0 |
| long | 0 | 0 | 1 | 1 | 0 | 0 | 0 |
| more | 0 | 0 | 1 | 1 | 0 | 0 | 0 |
| week | 0 | 0 | 0 | 1 | 0 | 0 | 0 |
| receive | 0 | 0 | 0 | 1 | 0 | 0 | 0 |
| product | 0 | 0 | 0 | 0 | 1 | 1 | 1 |
| *Feature #2* | 0 | 0 | 0 | 0 | 1 | 1 | 0 |
| great | 0 | 0 | 0 | 0 | 1 | 1 | 1 |
| fit | 0 | 0 | 0 | 0 | 1 | 1 | 1 |
| perfectly | 0 | 0 | 0 | 0 | 1 | 1 | 1 |

GENERATING A SET OF REPRESENTATIVE ITEMS USING A DYNAMIC SELECTION STRATEGY

BACKGROUND

Generally described, computing devices and communication networks can be utilized to exchange information. In a common application, a content computing device of a content provider may receive a request from a user computing device for items selected from a set of items. For example, a set of items may include reviews, search results, or the like. Typically, the content computing device utilizes one or more characteristics to identify and return a subset of items in the set in response to the request. In the simplest case, the content computing device may quickly analyze each of the items in the set of items in view of one desired characteristic to identify the subset of items to return to the user computing device. However, as the number or complexity of the desired characteristics increases, the content computing device may have to expend ever increasing amounts of power and processing resources to sort through and identify the subset of items from the set of items that should be returned to the user computing device.

Content providers are generally motivated to provide requested content to user computing devices quickly and with minimum utilization of power and processing resources by computing devices processing those requests. As such, decreasing the amount of resources required to respond to a request for items remains a challenge.

BRIEF DESCRIPTION OF THE DRAWINGS

FIG. 2B depicts a table illustrating an example associated collection of elements derived from a set of reviews and used to select a representative set of reviews for the given item, such as that shown in FIG. 2A.

DETAILED DESCRIPTION

Figure 1:
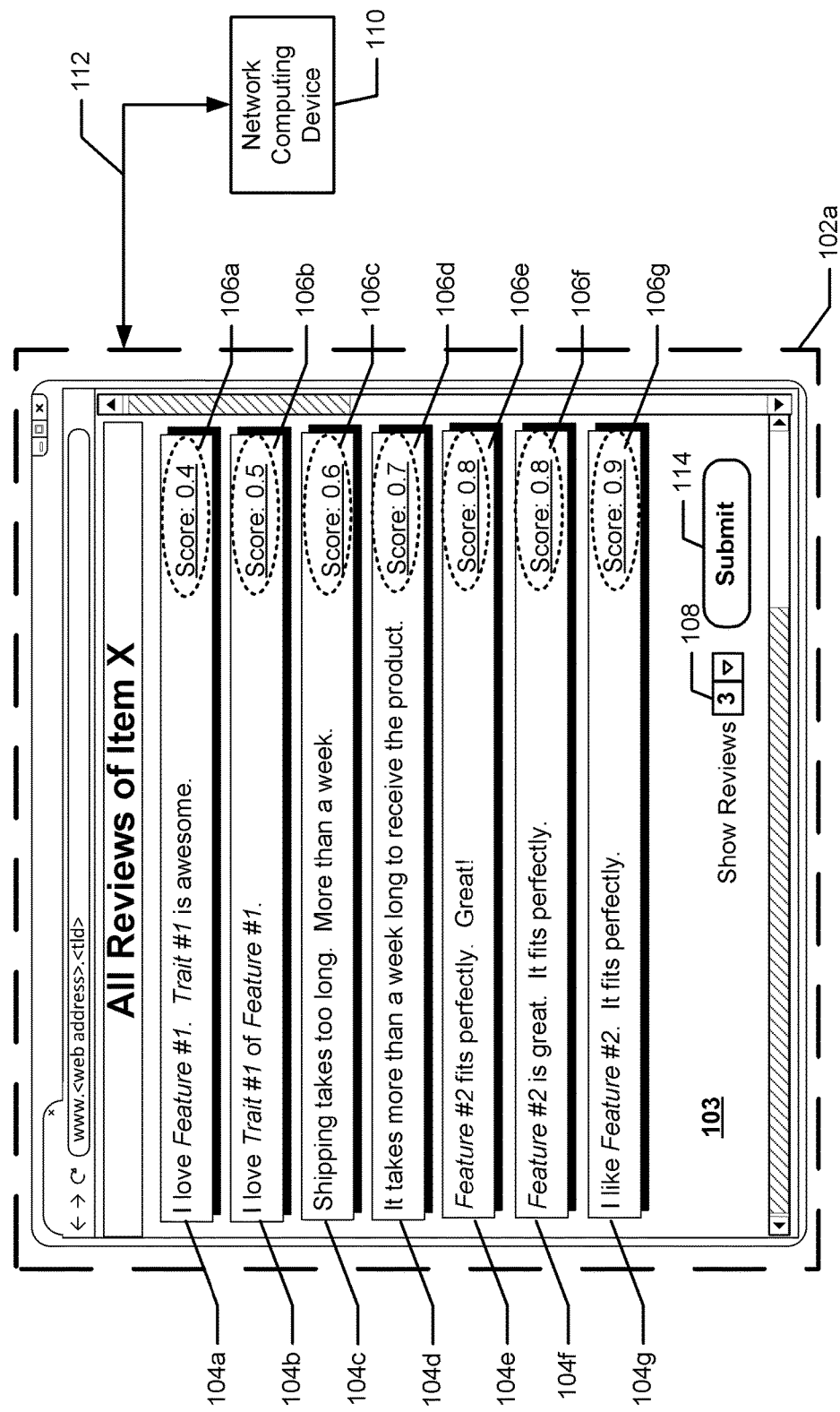
FIG. 1 is a pictorial diagram depicting an example user interface presenting all of the reviews for a given item.

Reviews of an item may generally assist consumers to gain a sense of how others perceive the item. However, each review may vary considerably in terms of the quality or usefulness of that review to consumers. For example, a review of an item that features a short description of the item with no reasoning behind the rating assigned to the item may not provide consumers with enough information to understand or trust the review. On the other hand, another review of the item that features an expansive description of various features of the item may be significantly more helpful to consumer deciding whether to purchase that item.

In some suboptimal solutions to improve the consumers' reliance on reviews, each review may be analyzed based on various criteria in order to determine a "utility" of the review. In particular, the utility of the review may indicate an expectation of how useful or helpful the review may be to consumers that are assessing the item that is the subject of the review. Various characteristics of the review may be determined and the utility value of the review may be generated based on an assessment of one or more of characteristics. For example, a computing system may determine the overall utility value of a review based the length of the review, a number of other reviews the author of the review has created, the frequency of reviews that the author has created within a certain period of time, and various other criteria or combinations of criteria. In some embodiments, the utility value of a review may also, or alternatively, be based on one or more of a number of users that have indicated that the review is helpful or a number of users that have indicated that the review is not helpful (or a ratio of those users). For example, the computing system may receive notifications, votes, or other feedback for a review that indicate whether the review is helpful to users (e.g., by providing useful information about the item) or whether the review is not helpful. The computing system may determine utility values for multiple reviews of an item and may present a ranked list of the highest scoring reviews to consumers, thereby enabling the consumers to focus on the reviews that may be the most helpful as determined based on the utility values of those reviews.

While solutions such as those described above provide consumers with access to reviews that have been determined to be potentially useful, these solutions do not attempt to identify a set of reviews that, when considered together, substantially represents all of the reviews of the item. In particular, these solutions do not consider the value of presenting reviews that are associated with different characteristics or content. In an example, these solutions may utilize a common set of criteria to score a set of reviews and may return a subset of the highest scoring reviews. However, because the set of reviews are scored using the same set of criteria, the subset of reviews returned to the user may focus on certain characteristics and may not focus on potentially valuable characteristics associated with other reviews in the set that did not score as highly due to various reasons. In such situations, consumers may benefit from receiving a set of reviews that have high utility values and that represent diverse characteristics.

According to some suboptimal solutions, the computing system may generate a subset of reviews representative of a set of reviews by selecting every possible group of reviews in the set and analyzing the utility values of each of these possible groups and the degree to which each of these possible groups represents the characteristics of the set of reviews as a whole. After analyzing every possible group, the computing system may then identify the group that has the highest utility values and that best represents the characteristics of the set of reviews. However, this process may require the computing system to expend a considerable amount of processing resources and power to check each possible group. As such, the computing device may benefit from a streamlined process for selecting reviews that requires less power and fewer processing resources.

In overview, aspects of the present disclosure include systems and methods for quickly generating a set of representative reviews from a larger set of reviews. Specifically, the computing device may obtain a set of reviews for an item from local storage or from a data repository of review information. The computing device may then select a set of representative reviews from the set of reviews using a maximum-set-coverage selection strategy, a clustering selection strategy, or a combination of both strategies. As further described herein, by implementing one or both of these selection strategies, the computing device may efficiently identify a subset of reviews in the set of reviews that substantially (or best) represents diverse characteristics of the set of reviews as a whole, while using a smaller amount of power and processing resources than other solutions directed to the same purpose, such as those described above.

In some embodiments, the computing device may select a set of representative reviews from a set of reviews using a maximum-set-coverage selection strategy. According to this strategy, the computing device may derive an associated collection of elements from reviews in the set of reviews. The computing device may determine marginal utility values of each of the reviews in the set of reviews based at least in part on the elements, in the associated collection of elements, that are related to the reviews. The computing device may select the review having the highest marginal utility value, remove elements related to the selected review from the associated collection of elements, and determine updated marginal utility values for the reviews based on the remaining elements in the associated collection of elements. The computing device may perform the selection operations iteratively until a number of reviews that is desired has been selected. Because the computing device removes elements related to reviews that have been previously selected, each subsequent review that is selected may have a significant likelihood of being related to elements or characteristics that are not associated with previously selected reviews. As such, the set of selected reviews may include a diverse set of reviews and may substantially represent the set of reviews as a whole.

In some embodiments, an element of a review may correspond to one or more portions of content included in the review. By way of a non-limiting example, an element of a review may correspond to a word or phrase included in the review, and the set of elements associated with the review may include multiple (or all) of the words and phrases included in that review. In some embodiments, an element of a review may also (or alternatively) indicate or represent aspects of the review that may or may not depend on the specific content of the review. For example, an element of the review may indicate whether the review includes media (e.g., whether an image or video that is embedded in the review), attributes of the review that may be represented in metadata (e.g., a time at which the review was created), and the like. In some embodiments, an element of a review may also or alternatively indicate a characteristic of an author of the review, such as a location of the author, an aspect of the author's user profile, or an indication of whether the author is a verified purchaser of the item that is the subject of the review. In some embodiments, an element of a review may be derived from a characteristic of a user, such as a user of a user computing device that requests a number of reviews that are desired from presentation. In such embodiments, the user computing device of the user may provide personalized information (e.g., from a user profile) to the computing device. For example, the personalized information of a user may include preferences, purchase histories, relationships with other users, associations with related items, and the like. By utilizing a user's personalized information, the computing device may derive elements that are specific to that user.

In some embodiments, the computing device may determine the one or more elements that are associated with a review. The computing device may store the one or more elements associated with that review in a data structure that is referred to herein as a "associated collection of elements." The computing device may also store information in the associated collection of elements that indicates that the one or more elements are associated with the review. In such embodiments, the computing device may perform similar operations for each review in the set of reviews. As a result, the associated collection of elements may include information regarding the elements that are represented in the set of reviews, as well as the one or more reviews in the set that are associated with each element. By way of an example, the associated collection of elements may indicate that a review is associated with a first element and a second element. In this example, the associated collection of elements may also indicate that the first element is associated with the first review and a second review.

As described above, the computing device may select a set of representative reviews from the set of reviews based on the marginal utility values of the reviews. As used herein, the term "marginal utility value" denotes the expected desirability of selecting a review in context of zero or more other reviews that have been previously selected. Specifically, as noted above, once a review associated with an element is selected, the marginal utility value of selecting another review associated with the same element may decrease because that element is already represented in the review that was selected. The computing device may iteratively update the marginal utility value of reviews after each selection of a review from the set of reviews. In particular, the computing device may initially determine marginal utility values for each review in the set of reviews based on the elements included in the associated collection of elements that are associated with the review, select the review in the set of reviews having the highest marginal value, and remove the elements that are associated with selected review from the associated collection of elements. The computing device may then determine updated marginal utility values for the reviews in the set of reviews. The computing device may repeat the above operations to select a number of reviews that are desired from the set of reviews. Because the computing device performs a known number of iterations of the above operations (e.g., iterations equal to the number of reviews that are desired), the computing device may generate the set of representative reviews faster than other solutions, such as those in which the computing device checks every possible subset of reviews. As such, by performing this process (as further described herein), the computing device may generate a set of representative reviews using comparatively less power and fewer processing resources than by performing operations according to other solutions. The process for selecting a set of representative reviews using a maximum-set-coverage selection strategy is further described herein (e.g., with reference to FIGS. 2A, 2B, 5, 7, and 8).

In some embodiments, the iterative process through which the computing device selects a set of representative reviews from a set of reviews may yield an ordered set of representative reviews. Specifically, the first review from the set of reviews may have the highest overall marginal utility value of the reviews in the set of reviews. The second review selected from the set of reviews may have the second highest overall marginal utility value of the set of reviews, the third review selected from the set of reviews may have the third highest overall marginal utility value of the set of reviews, and so on. As a result, according to various embodiments, the computing device may select, from a set of reviews, a set of representative reviews that is diverse with respect to the elements of the set of reviews and that is also ranked from highest to lowest marginal utility values.

In some embodiments, the computing device may select a set of representative reviews from a set of reviews using a clustering-selection strategy. As noted above, providing reviews with similar characteristics to a user may be less helpful than providing the user with reviews having diverse characteristics. Thus, in some embodiments, the computing device may organize a set of reviews into a plurality of groups or "clusters" based at least in part on the characteristics, attributes, or features of the reviews. By way of a non-limiting example, the computing device may organize reviews into clusters based on the category that is associated with each review (e.g., a one-star category or a five-star category). The computing device may select one review from each cluster of reviews. As a result, the set of selected reviews may include only one review from each cluster of similar devices, thereby decreasing the likelihood that a review in the set of selected reviews is similar to another review in the set of selected review. The process of selecting a set of representative reviews is further described herein (e.g., with reference to FIGS. 3A, 3B, 6, 7, and 8).

In some embodiments, the computing device may generate representations of each review in the set of reviews, such as by generating a feature vector or other multi-dimensional representation of the review. The computing device may determine similarities or differences between the representations of the reviews and may utilize these similarities or differences to organize the reviews into clusters. By way of an example, the computing device may utilize a k-means clustering algorithm by generating a desired number of clusters (e.g., k clusters), generating feature vector representations of the reviews in the set, and using a Euclidean distance between representations to assign the corresponding reviews to one of the k clusters. The computing device may alternatively utilize one of various other clustering algorithms, as described herein.

In some embodiments, the computing device may utilize a first set of characteristics to organize the reviews into clusters. For example, the computing device may utilize content-based characteristics (e.g., words or phrases included in the reviews) to sort the reviews into a number of clusters. Further, in such embodiments, the computing device may utilize a second set of characteristics to determine a utility value of each of the reviews within each cluster. The computing device may utilize non-content-based characteristics as part of the second set of characteristics. For example, the second set of characteristics may include a number of users that have indicated that the review is helpful (sometimes referred to herein as a "helpfulness score"). The computing device may then select a review in each cluster having the highest utility score as determined using the second set of characteristics.

In some embodiments, the computing device may dynamically determine whether to utilize the maximum-set-coverage selection strategy or the clustering-selection strategy to select a set of representative reviews from a set of reviews. In such embodiments, the computing device may determine characteristics regarding the set of reviews, which may include content-based characteristics of the reviews or non-content-based characteristics related to the reviews. Based on these characteristics, the computing device may determine the selection strategy that should be used to select the representative set of reviews. Further, the computing device may monitor for changes in the characteristics of the set of reviews (e.g., the addition or deletion of a review or the change of a preexisting review) and may make a subsequent determination regarding the selection strategy that should be used based at least in part on the changed characteristics. The process for dynamically determining the selection strategy to utilize to select a set of representative reviews form a set of reviews is described further (e.g., with reference to FIG. 8).

In some embodiments, the computing device may be a network computing device (e.g., a server or network content provider device). The network computing device may receive a number of reviews of an item that are desired from another computing device (e.g., a user computing device). In response, the network computing device may perform the above process using the maximum-set-coverage selection strategy and/or the clustering-selection strategy to select a set of representative reviews such that the set of representative reviews includes the number of reviews that are desired received from the user computing device. In some embodiments (e.g., as further described herein), the network computing device and user computing device may each perform a portion of the operations to select a set of representative reviews from a set of reviews.

As described, the computing device may generate the set of representative reviews using fewer power and processing resources than other solutions. Further, according to some embodiments, the computing device may also select the set of representative reviews such that the set of representative reviews is particularly suited for display on a simplified user interface. In particular, some suboptimal solutions may generate a subset of reviews and may display those reviews. However, these solutions may not consider the limited display space that is available for displaying reviews, and as such, the subset of reviews generated by using these suboptimal solutions may not be appropriate or suitable for displaying on some computing devices. For example, the reviews in the subset may not easily fit on the display of a user computing device, causing portions of the review not to be rendered on the screen (e.g., a review extends past the edge of the display) or causing the position or format of the subset of reviews to change such that the reviews are difficult for users to read (e.g., small text).

In an improvement over solutions such as those described above, the computing device may, for each review in the set of reviews, determine characteristics of the review based at least in part on a consideration of how that review may be displayed on a user interface, including the length of the review or the amount of display space the review is expected to require. Additionally (or alternatively), the computing device may identify the reviews to include in the set of representative reviews based on characteristics of the computing device that will display the reviews. For instance, the characteristics of the computing device may include the size of the display of the computing device or formatting styles available on the computing device. In some embodiments, the computing device may select the representative set of reviews based at least in part on a combination of the characteristics of the reviews and characteristics of the display on which the reviews will be rendered. In such embodiments, the computing device may utilize these characteristics of the computing device as elements that are included in an associated collection of elements as part of the maximum-set-coverage selection strategy or as characteristics used to select reviews from clusters of reviews as part of the clustering-selection strategy.

As described, the term "item" refers generally to any tangible or intangible objects that may be referred to or described in a review. By way of non-limiting examples, an "item" may include any physical good, product, or object, any service (e.g., services provided by a business, organization, or individual person), or any digital product or media service. For example, a review of an item may be a review of a book, a movie, a service performed by a service technician, or the like. In addition, the term "item" is used interchangeably herein to refer to an item itself (e.g., a particular good, service, bundle of goods/services or any combination thereof) and to its description or representation in a computer system, such as an electronic catalog system. As will be apparent from the context in which it is used, the term is also sometimes used herein to refer only to the item itself or only to its representation in the computer system.

For ease of description, various embodiments are described herein with reference to selecting or determining a set of representative reviews for an item. However, in some embodiments, the computing device may create or determine a set of representative items from a set of items. In such embodiments, the computing device may, for each item of the set of items, generally determine characteristics of each of the set of items and may utilize those characteristics to select a subset of representative items according to the maximum-set-coverage selection strategy and/or the clustering-selection strategy. By way of a non-limiting example, the network computing device may determine a subset of representative cameras from a set of cameras based on elements associated with those cameras and/or by selecting the representative cameras from clusters of cameras created using characteristics of the set of cameras.

The various embodiments will be described in detail with reference to the accompanying drawings. Wherever possible, the same reference numbers will be used throughout the drawings to refer to the same or like parts. References made to the particular examples and implementations are for illustrative purposes, and are not intended to limit the scope of the invention or the claims.

Figure 2A:
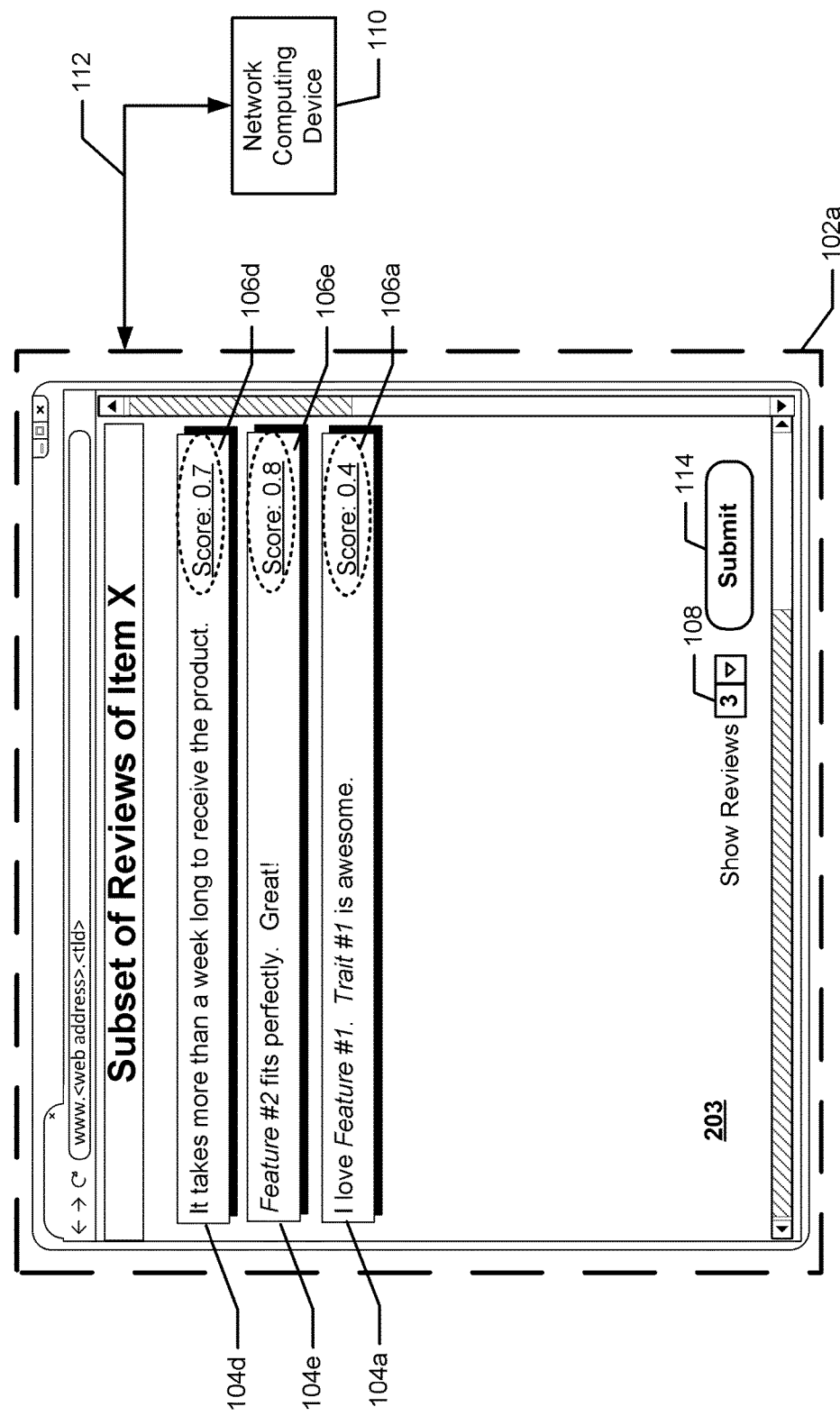
FIG. 2A is a pictorial diagram depicting an example user interface presenting a representative set of reviews for the given item described with reference to FIG. 1.
Figure 3A:
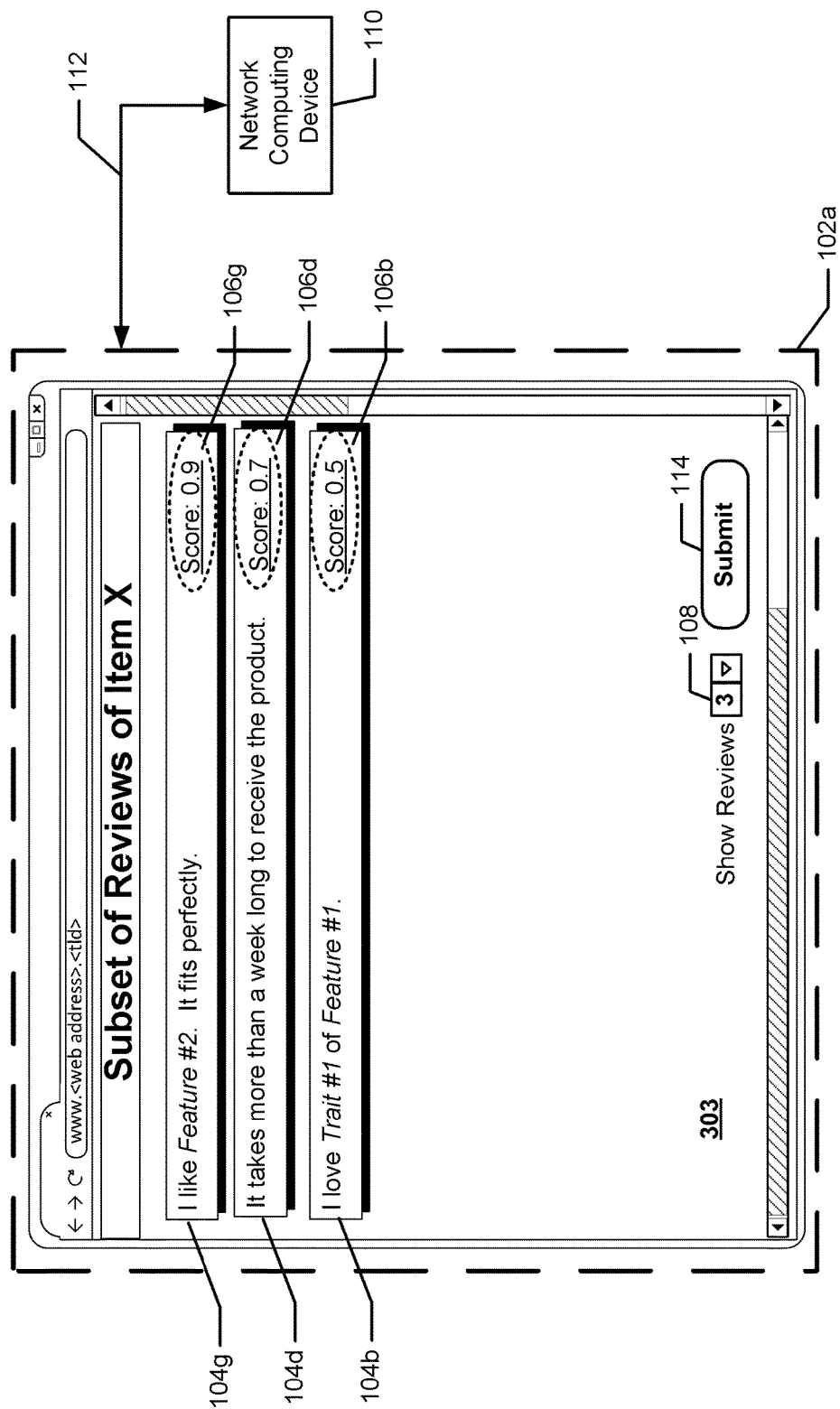
FIG. 3A is a pictorial diagram depicting another example user interface presenting a representative set of reviews for the given item described with reference to FIG. 1.

FIGS. 1, 2A, and 3A depict a network communication system 100 including a user computing device 102a and a network computing device 110, according to some embodiments. Those skilled in the art will recognize that the user computing device 102a and/or the network computing device 110 may be any of a number of computing devices that are capable of communicating over a network. Such computing devices may include, but are not limited to, laptop computers, personal computers, personal digital assistants (PDA), hybrid PDAs/mobile phones, mobile phones, smartphones, wearable computing devices, electronic book readers, digital media players, tablet computer, gaming console or controller, kiosk, augmented reality devices, other wireless devices, set-top or other television boxes, and the like. For example, the user computing device 102a may be a smartphone configured with a browser application that enables a user to request and display network pages. In some embodiments, the network computing device 110 may be a server or network content provider that includes one or more computing devices capable of communicating with the computing device 102a and configured to generate a subset of reviews, according to various embodiments such as those described below.

In the examples illustrated in FIGS. 1, 2A, and 3A, the user computing device 102a may be in communication with the network computing device 110 via a communication link 112. In some embodiments, the communication link 112 may include one or more wired or wireless communications links across one of more wired or wireless networks. For ease of description, the network computing device 110 is illustrated in FIGS. 1, 2A, and 2B as in direct communication with the network computing device 110 via the communication link 112. However, in some embodiments (e.g., as described with reference to FIG. 4), the communication link 112 may include one or more intermediary devices, such as one or more routers, proxy servers, network address translation devices, and the like.

FIG. 1 is a pictorial diagram depicting an example user interface 103 presenting multiple reviews for a given item. As shown in FIG. 1, a network computing device 110 has provided a set of reviews of the item (e.g., "Item X") to a user computing device 102a for presentation in the user interface 103. For example, the user computing device 102a may have sent a request to the network computing device 110 for reviews of the item via a communication link 112. In some embodiments, in response to receiving the request for reviews of the item, the network computing device 110 may obtain a set of multiple reviews (or in some instances a set of all reviews) related to the requested item. The network computing device 110 may then send the set of reviews to the user computing device 102a. The user computing device 102a may display or render the reviews received from the network computing device 110 via a user interface, such as user interface 103.

In some embodiments (not shown), the network computing device 110 may rank the set of reviews based on various criteria or combinations of criteria associated with each of the reviews. For example, the network computing device 110 may rank the reviews based on the length of the reviews, an assessment of the quality of the reviews, a number of users that have indicated that each of the reviews is helpful (or unhelpful), and the like. In such embodiments, the network computing device 110 may provide the set of ranked reviews to the user computing device 102a, and the user computing device 102a may present the set of ranked reviews on the user interface 103 in order.

In the example illustrated in FIG. 1, the user computing device 102a may have received a set of seven reviews 104a-104g for "Item X" from the network computing device 110. In some embodiments, the user computing device 102a may receive the set of reviews 104a-104g as part of a network page generated at the network computing device 110 and provided to the user computing device 102a from the network computing device 110. As such, the network computing device 110 may render the representative reviews in the user interface 103 as part of the network page received from the network computing device 110.

Each of the set of reviews 104a-104d may optionally be associated with one or more scores, such as indicated by indicators 106a-106g. By way of an example, the review 104a may be associated with a score of 0.4, and the review 104c may be associated with a score of 0.6. In some embodiments, the network computing device 110 may generate one or more scores for each of the reviews 104a-104g based on various criteria. By way of a non-limiting example, the network computing device 110 may determine a number of users that have indicated that a review was helpful via selecting a "like" button, submitting an "up" vote, or the like and may determine a number of users that have indicated that the review was not helpful (e.g., via selecting a "dislike" button, submitting a down-vote, or the like). The network computing device 110 may then determine the helpfulness score of the review as the ratio or percentage of the number of users that indicated that the review was helpful to the number of users that indicated that the review was not helpful. In a specific example, the score of 0.5 for the review 104b may indicate that an equal number of users have indicated that the review is helpful and unhelpful.

In some embodiments, the user interface 103 of the user computing device 102a may include an input field 108 (e.g., an option or selection box) and a submit button 114 (e.g., a button rendered on a network page, such as a web page). In such embodiments, the user computing device 102a may receive user input, via the input field 108, that indicates a number of reviews that is desired for presentation on the user interface 103. In the illustrated example, the user may have entered "3" into the input field 108 to indicate that the user desires to see three reviews for Item X. Further, the computing device 102a may receive a user input via an input field 108 and submit button 114 (or other user interface control) that may cause the computing device 102a to send a request to the network computing device 110 for the desired number of reviews indicated in the input field 108, such as via the communication link 112.

In response to receiving the request for the desired number of reviews, the network computing device 110 may be required to select a subset of reviews from the set of reviews provided to the user computing device 102a. In the example illustrated in FIG. 1, the network computing device 110 may have initially provided the user computing device 102a with a set of seven reviews that includes reviews 104a-104g. However, in this example, the user computing device 102a may request that the network computing device 110 provide the user computing device 102a with a subset of three reviews. In order to respond to the request of the user computing device 102a, the network computing device 110 may select a subset of three reviews from the set of reviews 104a-104g that may have a high likelihood of being helpful or useful to the user of the user computing device 102a and/or that may substantially represent the characteristics of the set of reviews 104a-104g as a whole. As described further herein, the network computing device 110 may select a set of representative reviews from of the set of reviews 104a-104g using a maximum-set-coverage strategy (e.g., as described with reference to FIGS. 2A-2B) or using a clustering-selection strategy (e.g., as described with reference to FIGS. 3A-3B). In some additional (or alternative) embodiments, the network computing device 110 may select the set of representative reviews using a combination of the maximum-set-coverage strategy and the clustering-selection strategy.

FIG. 2A is a pictorial diagram depicting an example user interface 203 presenting a set of representative reviews selected from the reviews for Item X using a maximum-set-coverage selection strategy, according to some embodiments. As described, the network computing device 110 may receive a request from the user computing device 102a to select a desired number of reviews (e.g., three reviews) from the set of reviews 104a-104g (e.g., as illustrated in FIG. 1). In some embodiments, the networking computing device 110 may receive the request for a number of reviews that are desired via the communication link 112. In some embodiments, the network computing device 110 may receive cookie or other state information from the user computing device 102a via the communication link 112 (either as part of the request or in a separate exchange), and the network computing device 110 may utilize this cookie or other state information to determine the number of reviews to include in the set of representative reviews. Alternatively, or additionally, the network computing device 110 may determine the number of reviews that are desired based on a predetermined or preconfigured number that may be received from another computing device or that may be stored locally on the network computing device.

In response to receiving or obtaining the desired number of reviews for an item, the network computing device 110 may select a set of representative reviews from the set of reviews for the item using an associated collection of elements that includes elements related to one or more of the reviews in the set and that includes information regarding the reviews in the set that are associated with each element in the associated collection of elements. A review may be associated with or represented as a set of elements, and each element of the set of elements may correspond to a different characteristic, attribute, feature, portion of content, or the like for the review. As such, the associated collection of elements generated from a set of reviews may represent the collective characteristics of the reviews in that set of reviews.

In some embodiments, elements included in an associated collection of elements may correspond to words or phrases of a review, such as illustrated in FIG. 2B. Specifically, FIG. 2B is a pictorial diagram of an example associated collection of elements represented as a table 250 of words and phrases included in the set of reviews 104a-104g (e.g., as described with reference to FIG. 1). The table 250 may include a first column of words or phrases that are included in one or more of the reviews 104a-104g. The table 250 may further include a column for each of the reviews 104a-104g (illustrated, respectively, as "Review 1" through "Review 7"). The table 250 may further indicate the reviews 104a-104g that include the words or phrases included in the table. For example, the table 250 may indicate that the review 104a and the reviews 104a both include the word "love," as represented by the indicator "1." In another example, the table 250 may indicate that the review 104a includes the word "awesome" as represented by the value "1" and that the review 104b does not include the word "awesome" as represented by the value "0."

In some embodiments, the network computing device 110 may remove or exclude common or generic elements from the associated collection of elements. In the example illustrated in FIG. 2B, the network computing device 110 may generate the associated collection of elements represented by the table 250 such that common words that are included in the reviews 104a-104g are not added to the table 250. For example, the generic words "I," "this," "the," "is" are included in the review 104a, but the network computing device 110 may omit elements corresponding to these generic words from the table 250. By omitting common or generic elements from the associated collection of elements, the network computing device 110 may cause the associated collection of elements to represent desirable or relatively important characteristics of the reviews 104a-104g. In some embodiments, the network computing device 110 may apply a filter to the bag of element to remove undesirable elements, such as by removing elements from the associated collection of elements that are related to words included in a predetermined list of generic words. In some embodiments, the network computing device 110 may not include undesirable or generic elements in the associated collection of elements, and as a result, the network computing device 110 may not need to remove these elements from the associated collection of elements.

In some embodiments, the network computing device 110 may generate the associated collection of elements from a set of reviews in response to receiving a request for a desired number of reviews from that set of reviews. For example, the network computing device 110 may receive a request for a desired number of three reviews from a set of reviews for an item, and in response, the network computing device 110 may generate an associated collection of elements from the set of reviews for that item. In some alternative (or additional) embodiments, the network computing device 110 may generate the associated collection of elements for a set of reviews for an item before a request for a desired number of reviews has been received. In such embodiments, the network computing device 110 may have pre-generated the associated collection of elements in anticipation of providing a desired number of reviews. Particularly, the network computing device 110 may have generated the associated collection of elements during a period of low activity in which the network computing device 110 may have had a relatively high number of processing and power resources in which to generate the associated collection of elements.

After generating the associated collection of elements, the network computing device 110 may select the desired number of reviews from the set of reviews 104a-104g based on the marginal utility value of each of the reviews 104a-104g. In some embodiments, the network computing device 110 may attempt to select reviews that cover the greatest number of different elements in the associated collection of elements. As such, the network computing device 110 may calculate the marginal utility values of the reviews 104a-104g by counting the number of elements in the associated collection of elements that are associated with each of the reviews 104a-104g. The network computing device 110 may then select the review in the set of reviews 104a-104g that is associated with the highest number of elements. By way of an example, the network computing device 110 may reference the table 250 to determine that the review 104d has the highest marginal utility value because the review 104d is associated with the highest number of elements (e.g., five elements).

As described, by selecting a review from a set of reviews for presentation to a user, the network computing device 110 may affect the marginal utility values of the other reviews in the set of reviews. Specifically, other reviews in the set of reviews that share one or more elements with the review that is selected may have decreased marginal utility values because those elements are already represented in the selected review. In the example illustrated in FIG. 2B, the review 104d is associated with elements for the words "long," "more," and "week," which are also associated the review 104c. Thus, after selecting the review 104d, the review 104c may be less likely to be helpful to a user that receives the review 104d due to the substantial overlap in content between the review 104c and 104b.

In order to increase the likelihood that all of the reviews that are selected from the set of reviews will be helpful to the user and/or that the selected reviews will represent the characteristics of the set of reviews as a whole, the network computing device 110 may determine updated marginal utility values for the reviews represented in the associated collection of elements in light of the one or more reviews that have already been selected. Specifically, once a review has been selected, the network computing device 110 may modify the associated collection of elements to indicate that the elements in the associated collection of elements that are associated with that review have already been selected. In some embodiments, the network computing device 110 may remove those elements from the associated collection of elements. Alternatively, the network computing device 110 may update the associated collection of elements to indicate that no review is associated with an element associated with a previously selected review. Referring to the example illustrated in FIG. 2B, after selecting the review 104d, the network computing device 110 may update the table 250 to remove the elements for the words "long," "more," "week," "receive," and "product."

After removing the elements of the selected review from the associated collection of elements, the network computing device 110 may recalculate the marginal utility value for the set of reviews. As described, in some embodiments, the network computing device 110 may determine the number of elements that are associated with each of the reviews after removing the elements associated with the previously selected review. Thus, after selecting the review 104d and removing the elements associated with the selected review from the associated collection of elements, the network computing device 110 may determine updated marginal utility values of the set of reviews by determining the number of remaining elements that are associated with each of the reviews. The network computing device 110 may then select the review from the set of reviews having the highest updated marginal utility value.

For the example illustrated in FIG. 2B, the network computing device 110 may determine that the reviews 104a, 104e, and 104f have the highest updated marginal utility rate because each of these reviews is associated with four elements in the table 205 after the elements associated with the review 104d were removed. In some embodiments, the network computing device 110 may implement one or more tiebreakers in the event that two or more reviews have the highest marginal utility value. For example, the network computing device 110 may implement a random or pseudo-random selection process to select one of the two or more reviews. Referring to the example illustrated in FIG. 2B, the network computing device 110 may utilize a tiebreaker to select the review 104e.

In some embodiments, the network computing device 110 may perform the operations of determining marginal utility values of the reviews in the set of reviews based on the elements included in the bag of element, selecting the review having the highest marginal utility value, and removing elements associated with the selected review from the associated collection of elements in a loop until the desired number of reviews from the set has been selected. In the examples illustrated in FIGS. 2A and 2B, the network computing device 110 may iteratively select reviews 104d, 104e, and 104a, which may represent the desired number of reviews requested by the user computing device 102a. The network computing device 110 may then provide the selected reviews 104*d*, 104*e*, and 104*a* to the user computing device 102*a*, and the user computing device 102*a* may render or display the selected reviews 104*d*, 104*e*, and 104*a* in the user interface 203 as depicted in FIG. 2A.

In some embodiments, the order in which the network computing device 110 selects the reviews may correspond to an ordered list of reviews, wherein the first review that is selected (e.g., the review with the highest overall marginal utility value) may be first in the ordered list, the second review that is selected (e.g., the review having the second highest overall marginal utility value) may be second in the ordered list, and so forth. Thus, as a result of performing the above operations, the network computing device 110 may generate an ordered set of representative reviews from the set of reviews. For example, the network computing device 110 may provide the selected reviews 104*d*, 104*e*, and 104*a* in the order in which the network computing device 110 selected those reviews 104*d*, 104*e*, and 104*a*, and the user computing device 102*a* may display the representative reviews 104*d*, 104*e*, and 104*a* according to their corresponding ranks. In some embodiments, after selecting the reviews, the network computing device 110 may order or rank the selected reviews by one or more criteria that may (or may not) be related to the elements included in the associated collection of elements. For example, rather than providing the user computing device 102*a* with the selected reviews 104*d*, 104*e*, and 104*a* in the order in which those reviews were selected, the network computing device 110 may instead rank or reorder the reviews 104*d*, 104*e*, and 104*a* based on a score associated with those reviews, such as the scores 106*d*, 106*e*, and 106*a* depicted in FIG. 2A. In this example, the network computing device 110 may order the selected reviews 106*d*, 106*e*, and 106*a* based on a decreasing order of the scores 106*d*, 106*e*, 106*a* such that the review 106*e* is ordered first, the review 106*d* is ordered second, and the review 106*a* is ordered third.

FIG. 3A is a pictorial diagram depicting an example user interface 303 presenting a set of representative reviews selected from the reviews for Item X using a clustering-selection strategy, according to some embodiments. As described, the network computing device 110 may receive a request from the user computing device 102*a* to select a desired number of reviews (e.g., three reviews) from the set of reviews 104*a*-104*g* (e.g., as illustrated in FIG. 1). In some embodiments, the networking computing device 110 may receive the request for a number of reviews that are desired via the communication link 112 or may otherwise obtain the number of reviews that are desired (e.g., as described with reference to FIG. 2A).

In some embodiments in which the network computing device 110 selects the desired number of reviews from the set of reviews using a clustering-selection strategy, the network computing device 110 may attempt to select reviews that substantially represent the characteristics of the set of reviews as a whole. Generally described, the network computing device 110 may group the reviews into a number of clusters of similar reviews that is equal to the number of reviews that are desired using a clustering algorithm. The network computing device 110 may then, for each cluster of reviews, select one review from the cluster of reviews that has the highest utility value or the highest likelihood of being useful to a user. Because the number of clusters of reviews is the same as the number of reviews that are desired, the network computing device 110 may select one review from each cluster in order to select the desired number of reviews.

The network computing device 110 may organize the set of reviews into clusters by determining one or more characteristics, features, and the like for each of the reviews in the set. In some embodiments, these characteristics may be similar to the characteristics that the network computing device 110 identifies when creating an associated collection of elements for a set of reviews (e.g., as described with reference to FIGS. 2A and 2B). Alternatively, the characteristics may be dissimilar from those used to create an associated collection of elements.

In some embodiments, the network computing device 110 may generate a feature vector representation of each review in the set of reviews. In such embodiments, a feature vector may be a multi-dimensional representation of the characteristics of a review. For example, the feature vector may be an indexed array. Each index in the feature vector may correspond to a different characteristic, and the value stored at the index in the feature vector may correspond to a value of the characteristic. In a simple example, the feature vector V of a review r may describe two characteristics of the review (e.g., $V_r = \{\text{value of characteristic}_1, \text{value of characteristic}_2\}$). In some embodiments, the values represented in the feature vector may be numerical values (e.g., 20, 0.1, etc.), Boolean values (e.g., "true" or "false"), or more complex information, such as representations of words, phrase, or the like.

The network computing device 110 may utilize the representations of the reviews to identify similarities among the reviews. In some embodiments, the network computing device 110 may utilize one (or more) clustering algorithms in order to group the reviews into clusters of similar reviews. For example, the network computing device 110 may utilize a K-means clustering algorithm and the representations of the reviews in the set to organize the reviews into a number of clusters that is equal to the desired number of reviews (e.g., k clusters). In some embodiments, the network computing device 110 may utilize one or more dissimilarity functions as part of generating the clusters of reviews. In the above example in which the network computing device 110 utilizes a K-means clustering algorithm, the network computing device 110 may utilize the Euclidean distance between representations of the reviews as the dissimilarity function. However, in some embodiments, other dissimilarity functions other than the Euclidean distance function may be utilized, such as dissimilarity functions that may be suitable for use with representations of reviews that include characteristics with ordinal or categorical values. For example, the network computing device 110 may utilize a Likert scale to generate clusters of reviews having characteristics with ordinal values.

Figure 3B:
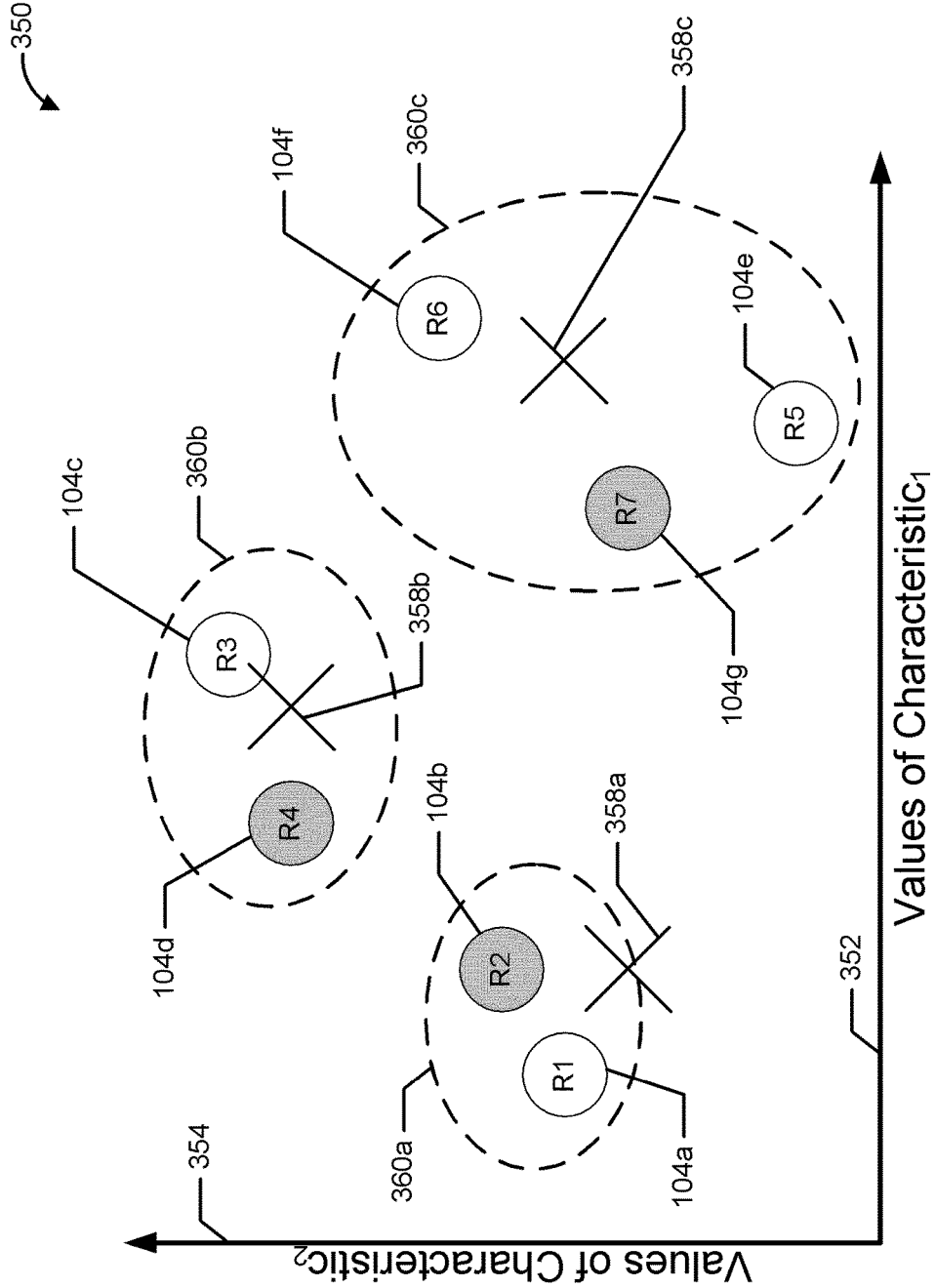
FIG. 3B is a pictorial diagram depicting a clustering of reviews used to select a representative set of reviews for the given item, such as that shown in FIG. 3A.

The example illustrated in FIG. 3B depicts a graph 350 representation of three clusters of reviews 360*a*-360*c* that includes members from the set of reviews 104*a*-104*g*. In this example, the network computing device 110 may have generated two-dimensional vector representations of each of the reviews 104*a*-104*g*. Each dimension of the two-dimensional vector representations of the reviews 104*a*-104*g* may reflect the values of a characteristic of the reviews 104*a*-104*g*. The values of these characteristics may be plotted on a first axis 352 associated with a first characteristic (e.g., illustrated as "Values of Characteristic$_1$" in FIG. 3B) and on a second axis 354 associated with a second characteristic (e.g., illustrated as "Values of Characteristic$_2$" in FIG. 3B). In order to identify the clusters of related reviews from the representations of the reviews 104*a*-104*g*, the network computing device 110 may determine a number of clustering points in the graph 350 equal to the number of reviews that are desired that the network computing device 110 will select. As depicted, the network computing device 110 may determine three clustering points 358a-358c. In some embodiments, the network computing device 110 may initially determine the location of the clustering points 358a-358c in the graph 350 by placing those clustering points 358a-358c at random locations in the graph 350. The network computing device 110 may then assign each of the reviews 104a-104g to the closest clustering points and adjust the locations of those clustering points 358a-358c based on the locations of the one or more reviews that are associated with each of the clustering points 358a-358c. In such embodiments, the network computing device 110 may repeat the operations for assigning reviews to the closet clustering point and adjusting the location of the clustering points until the assignments of the reviews 104a-104g do not change (or after a predetermined number of iterations). With reference to the example illustrated in FIG. 3B, the network computing device 110 may have, after one or more iterations and in view of the locations of the clustering points 358a-358c, determined that the reviews 104a and 104b belong to a first cluster of reviews 360a, that the reviews 104c and 104d belong to a second cluster of reviews 360b, and that the reviews 104e-104g belong to a third cluster of reviews 360c.

In some embodiments, reviews that are more similar may be more likely to be included in the same cluster of reviews. As described, the network computing device 110 may avoid presenting reviews that are substantially similar to a user due to the expected decrease in the marginal utility value of providing the user with similar reviews. Thus, after determining the one or more clusters of reviews to which each of the reviews 104a-104g belongs, the network computing device 110 may only select one review from each of the clusters of reviews. Specifically, because reviews in different clusters may be more dissimilar than reviews in the same cluster of reviews, the network computing device 110 may increase the likelihood that the selected reviews will be useful to a user by selecting one review from each cluster.

In the example illustrated in FIG. 3B, the review 104b may be more similar to the review 104a than to any other review, and as a result, the network computing device 110 may assign the reviews 104a and 104b to the same cluster of reviews 360a. Similarly, the network computing device 110 may assign the reviews 104c and 104d to the second cluster of reviews 360b and may assign the reviews 104e-104g to the third cluster of reviews 360c. Because the number of clusters of reviews 360a-360c is equal to the number of reviews that are desired requested by the user computing device 102a, the network computing device 110 may select the desired number of reviews by selecting one review from each of the clusters of reviews 360. For example, the network computing device 110 may select the review 104b from the first cluster of reviews 360a, the review 104d from the second cluster of reviews 360b, and the review 104g from the third cluster of reviews 360c.

In some embodiments, the network computing device 110 may, for each cluster of reviews, rank or order the one or more reviews in the cluster based on one or more criteria. For example, the network computing device 110 may utilize a helpfulness score (e.g., as represented by the indicators 106a-106g of FIG. 3A) to order the one or more reviews. In such embodiments, the network computing device 110 may select the one review in each cluster of reviews that is ordered or ranked first. In the examples illustrated in FIGS. 3A and 3B, the network computing device 110 may select the reviews 104b, 104d, and 104g from the clusters of reviews 360a-360c, respectively, in response to determining that the reviews 104b, 104d, and 104g are ordered first in their respective clusters.

Further, in some embodiments, the network computing device 110 may further order or rank the reviews that are selected from the clusters of reviews. The network computing device 110 may utilize the same criteria to order the selected reviews or, alternatively, the network computing device 110 may one or more other criteria to order the selected reviews. In the examples illustrated in FIGS. 3A and 3B, the network computing device 110 may have determined that the reviews 104b, 104d, and 104g had the highest helpfulness score of the reviews in the respective clusters of reviews 360a-360c and, as a result, may have selected those reviews 104b, 104d, and 104g. Further, the network computing device 110 may order the reviews 104b, 104d, and 104g based on their respective helpfulness scores. As illustrated by the indicators 106b, 106d, and 106g, the review 104g may have the highest helpfulness score, the review 104d may have the second highest helpfulness score, and the review 104b may have the third highest score. As such, the network computing device 110 may provide the reviews 104g, 104d, and 104b to the user computing device 102a in that order. In response, the user computing device 102a may render or display the selected reviews 104g, 104d, and 104b in the user interface 203 as depicted in FIG. 3A.

Figure 4:
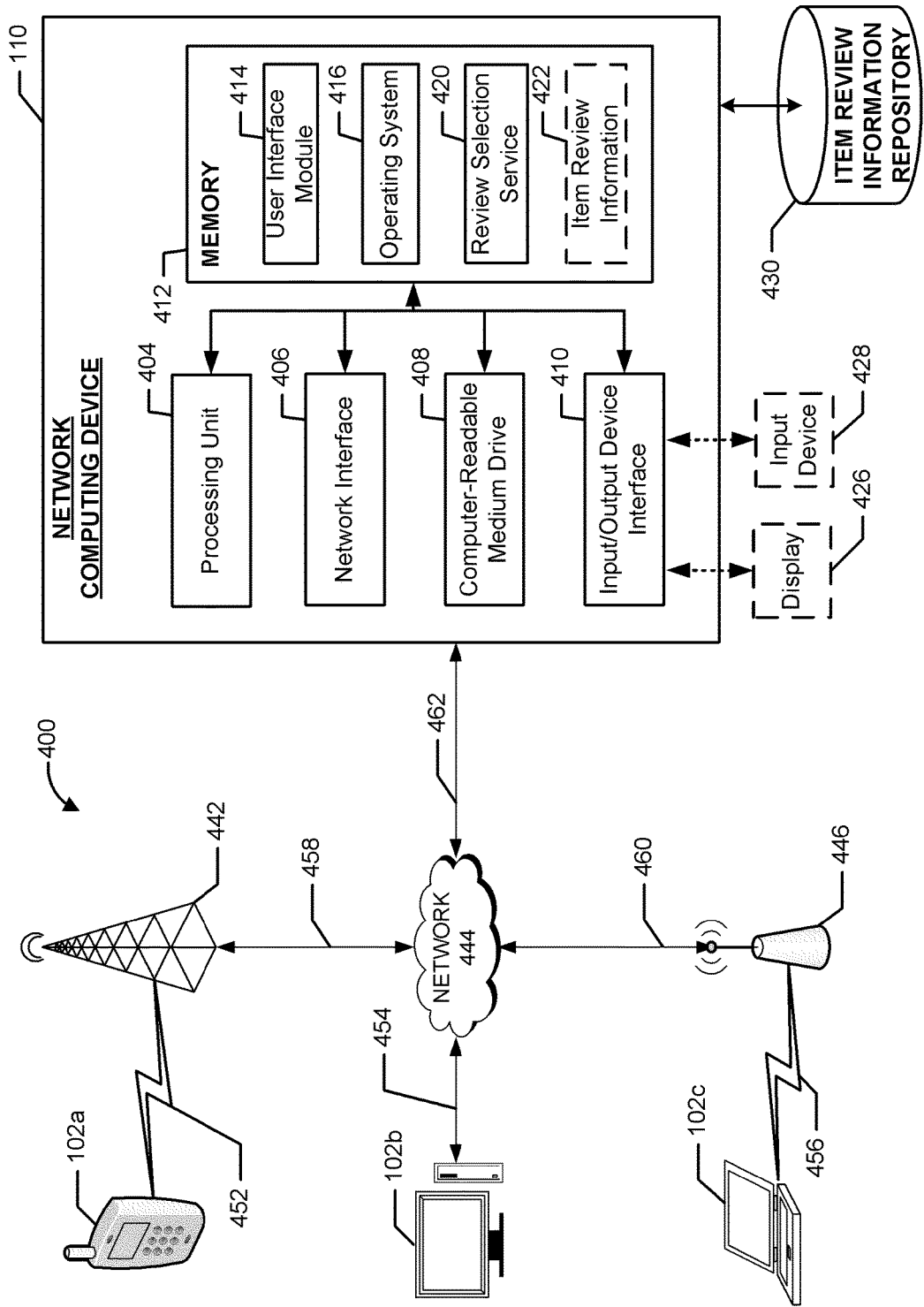
FIG. 4 is block diagram depicting an illustrative network computing device that generates a set of representative reviews for a given item and provides the set of representative reviews to a computing device for presentation in a user interface, such as that shown in FIG. 2A or 3A.

FIG. 4 is a block diagram depicting an illustrative operating environment 400 including a network computing device that generates a set of representative reviews for a given item and provides the set of representative reviews to a user computing device for presentation in a user interface. The environment 400 may include the network computing device 110 (e.g., as described with reference to FIGS. 1A and 1B). The environment 400 may further include one or more user computing devices, such as the user computing device 102a (e.g., as described with reference to FIGS. 1, 2A, and 3A) and one or more optional user computing devices 102b and 102c, which may be similar to or different from the user computing device 102a. In a non-limiting example, the user computing device 102a, 102b or 102c may be personal computing devices, laptop computing devices, hand held computing devices, terminal computing devices, mobile devices (e.g., mobile phones or tablet computing devices), wearable devices configured with network access and program execution capabilities (e.g., "smart eyewear" or "smart watches"), wireless devices, electronic readers, media players, home entertainment systems, gaming consoles, set-top boxes, televisions configured with network access and program execution capabilities (e.g., "smart TVs"), or some other electronic device or appliance. For ease of description, environment 400 is illustrated as including three user computing devices 102a-102c and including one network computing device 110. However, the environment 400 may include one or more user computing devices and one or more network computing devices without loss of generality.

In the environment 400, the computing devices 102a-102c may each communicate with the network computing device 110 by exchanging data and other information via a network 444. In an example, the user computing device 102b may communicate over the network 444 via a cellular link 452 to a cellular base station 442 that may maintain a wired link 458 to the network 444. The computing device 102b may send communications directly to the network 444 via wired link 454. The computing device 102c may communicate through the network 444 via a wireless connection 456 to a wireless access point 446 (e.g., a wireless router) that communicates with the network 444 via the wired link 460.

In some embodiments, the network 444 may route or forward requests for reviews of items (or network pages that include reviews of items) from the user computing devices 102a-102c to the network computing device 110 (e.g., as described with reference to FIGS. 1, 2A, and 3A) via communication link 462. In response, the network computing device 110 may receive and respond to requests for reviews of items from the one or more of the user computing devices 102a-102c by sending such responses through the network 444.

In some embodiments, the network computing device 110 may be in communication with a review information repository 430, which may include one or more reviews that the network computing device 110 may provide to one or more of the user computing devices 102a-102c on request. For example, the review information repository 430 may store reviews of items, quality values or scores of these reviews, characteristics or features of the reviews, and the like. The review information repository 430 may be local or remote to the network computing device 110, and/or may be a network-based service itself. The review information repository 430 may be embodied in hard disk drives, solid state memories, any other type of non-transitory computer-readable storage medium, and/or a file, a database, a relational database, in-memory cache, and/or stored in any such non-transitory computer-readable medium accessible to the network computing device 110. The review information repository 430 may also be distributed or partitioned across multiple local and/or storage devices without departing from the spirit and scope of the present disclosure. In some embodiments, some of all of the above review information may be stored locally on the network computing device 110. In the example illustrated in FIG. 4, the memory 412 may include item review information 422.

In some embodiments (not shown), one or more of the user computing devices 102a-102c may send requests to the network computing device 110 through one or more proxy servers. In such embodiments, the one or more proxy servers may receive the requests from the one or more user computing devices 102a-102c and may forward these requests to the network computing device 110. Similarly, the one or more proxy servers may receive responses from the network computing device 110 and may forward those responses to the appropriate user computing device 102a-102c.

The network 444 may be any wired network, wireless network, or combination thereof. In addition, the network 444 may be a personal area network, local area network, wide area network, cable network, satellite network, cellular telephone network, etc. or combination thereof. In addition, the network 444 may be a personal area network, local area network, wide area network, over-the-air broadcast network (e.g., for radio or television), cable network, satellite network, cellular telephone network, or combination thereof. For example, the network 444 may be a publicly accessible network of linked networks, possibly operated by various distinct parties, such as the Internet. In some embodiments, the network 444 may be private or semi-private networks, such as a corporate or university intranets. The network 444 may include one or more wireless networks, such as a Global System for Mobile Communications (GSM) network, a Code Division Multiple Access (CDMA) network, a Long Term Evolution (LTE) network, or some other type of wireless network. The network 444 may use protocols and components for communicating via the Internet or any of the other aforementioned types of networks. Protocols and components for communicating via the Internet or any of the other aforementioned types of communication networks are well known to those skilled in the art and, thus, are not described in more detail herein.

It will be recognized that many of the devices described above are optional and that embodiments of the environment 400 may or may not combine devices. Furthermore, devices need not be distinct or discrete. Devices may also be reorganized in the environment 400. For example, the network computing device 110 may be represented in a single physical server or, alternatively, may be split into multiple physical servers. In some embodiments, the network computing device may be represented implemented as a user computing device 102a, 102b, or 102c. Additionally, the environment 400 may not include a network 444.

FIG. 4 further depicts a general architecture of the network computing device 110, which includes an arrangement of computer hardware and software components that may be used to implement aspects of the present disclosure. The network computing device 110 may include many more (or fewer) elements than those shown in FIG. 4. It is not necessary, however, that all of these generally conventional elements be shown in order to provide an enabling disclosure.

As illustrated, the network computing device 110 includes a processing unit 404, a network interface 406, a computer readable medium drive 408, and an input/output device interface 410, all of which may communicate with one another by way of a communication bus. The network interface 410 may provide connectivity to one or more networks (e.g., the network 444) or computing systems and, as a result, may enable the network computing device 110 to receive and send information and instructions from and to other computing systems or services. For example, the network computing device 110 may receive requests for reviews from the user computing device 102a via the network interface 404, and the processing unit 404 may, in response, send a set of representative reviews to the requesting user computing device 102a over the network 444 using the network interface 404.

The processing unit 404 may also communicate to and from memory 412. The memory 412 may contain computer program instructions (grouped as modules or components in some embodiments) that the processing unit 404 may execute in order to implement one or more embodiments. The memory 412 generally includes RAM, ROM, and/or other persistent, auxiliary, or non-transitory computer-readable media. The memory 412 may store an operating system 414 that provides computer program instructions for use by the processing unit 404 in the general administration and operation of the network computing device 110. The memory 412 may further include computer program instructions and other information for implementing aspects of the present disclosure. For example, in some embodiments, the memory 412 may include a review selection service 420, which may be executed by the processing unit 404 to perform various operations, such as those operations described with reference to FIGS. 1, 2A, 2B, 3A, 3B, and 5-8.

In some embodiments, the review selection service 420 may implement various aspects of the present disclosure. For example, the review selection service 420 may select a set of representative reviews according to a maximum-set-coverage selection strategy (e.g., as described with reference to FIGS. 2A, 2B, and 5). The review selection service 420 may also, or alternatively, select a set of representative reviews from a set of reviews according to a clustering-selection strategy (e.g., as described with reference to FIGS. 3A, 3B, and 6). In some embodiments, the set of representative reviews may include a number of reviews that are desired, and this number may be obtained from the memory 412 or from one or more other computing devices (e.g., the user computing device 102a).

Additionally, in some embodiments, the review selection service 420 may be implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

While the review selection service 420 is illustrated as a distinct module in the memory 412, in some embodiments, the review selection 420 may be incorporated as a module in the operating system 416 or another application or module, and as such, a separate review selection service 414 may not be required to implement some embodiments. In some embodiments, the review selection service 414 may be implemented as part of a common web service (e.g., an HTTP web service).

Figure 5:
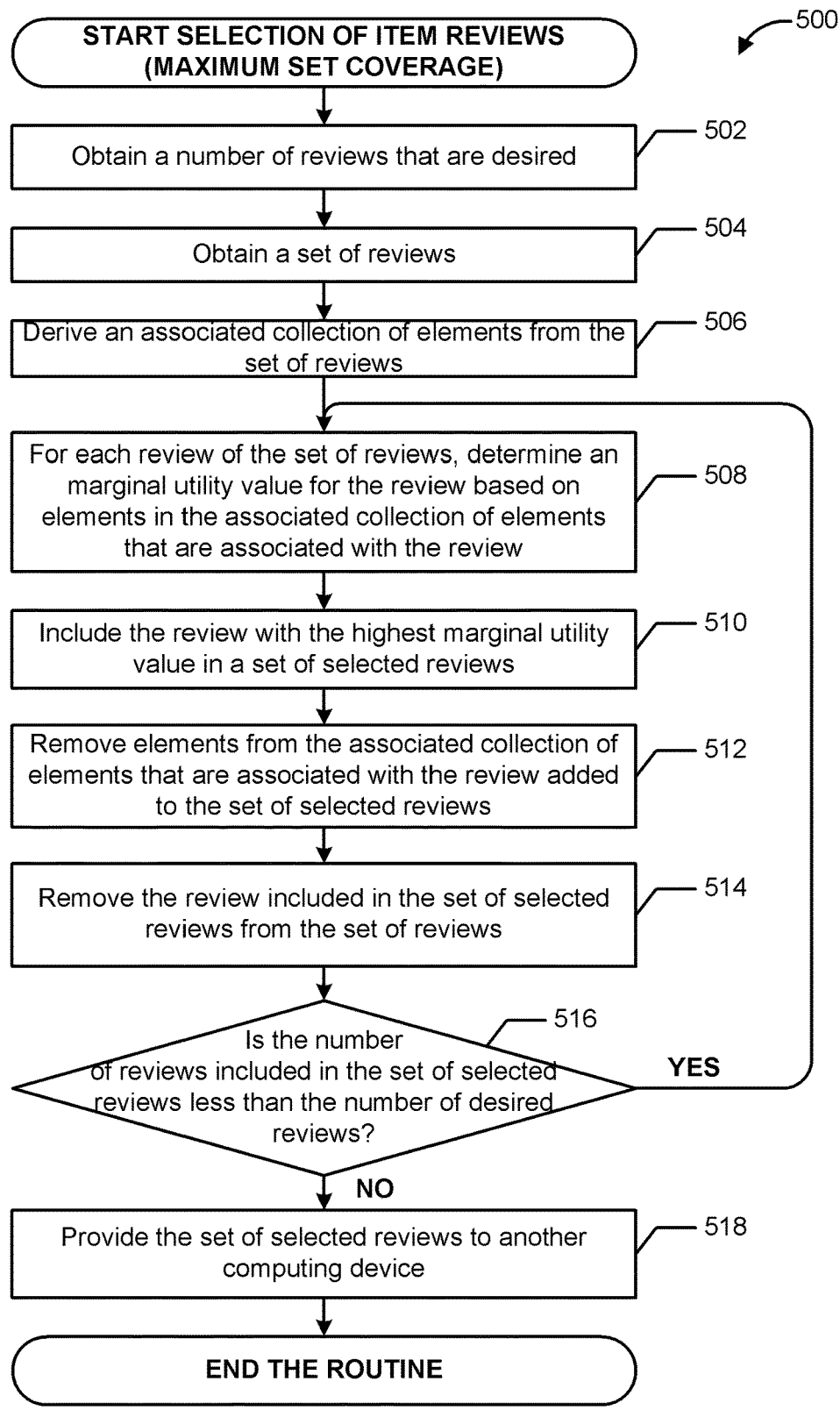
FIG. 5 is a flow diagram depicting an illustrative computer-implemented method that may be implemented by the network computing device shown in FIG. 4 to select a set of representative reviews from a set of reviews using maximum-set-coverage selection strategy.

FIG. 5 is a flow diagram depicting an illustrative computer-implement method or routine 500 for selecting a set of representative reviews from a set of reviews using a maximum-set-coverage selection strategy, according to some embodiments. The routine 500 may be implemented by a review selection service operating on a computing device (e.g., the review selection service 420 of the network computing device 110 as described with reference to FIG. 4).

In block 502, the review selection service 420 may obtain a number of reviews for an item that are desired for presentation. In some embodiments of the operations performed in block 502, the review selection service 420 may obtain the number of reviews that are desired from another computing device (the user computing device 102a as described with reference to FIGS. 1, 2A, and 3A). For example, a user of the other computing device may request a certain number of reviews related to a particular item from a much larger set of reviews that may be presented to the user on the display of the other computing device. Specifically, by way of a particular example, the user of the other computing device may wish to view ten or fifteen reviews of the item rather than all of the reviews available for the item.

In some embodiments, the review selection service 420 may obtain the number of reviews that are desired for the item from local storage and/or from another computing device via a network connection, such as from the item review information 422 stored in the memory 412 and/or from the item review information repository 430 (e.g., as described with reference to FIG. 4). For instance, the number of reviews that are desired may be a number of reviews that the computing device will provide to another computing device. Specifically, the number of reviews that are desired may not be received as part of a request from another computing device. For example, the review selection service 420, as a result of performing the operations of the routine 500 (as further described below), the review selection service 420 may send the number of reviews that are desired to any computing device that requests reviews for the item. In some embodiments, the number of reviews that are desired may be set by the review selection service 420, by another computing device in an electronic system, by an original equipment manufacturer, by a customer, or the like.

In some embodiments of the operations performed in block 502, the review selection service 420 may determine the number of reviews that are desired for an item based at least in part on one or more characteristics of the computing device on which the reviews will be presented and/or one or more characteristics of the network connection of the computing device. As noted above, the review selection service 420 may obtain information regarding the display or user interface of the computing device requesting reviews for an item (e.g., the user computing device 102a). This information of the display may include the type of browser operating on the computing device, settings of the browser operating on the user computing device, an amount of available display space (e.g., the width and height of the display in term of pixels), or other setting related to the computing device. In such embodiments, the review selection service 420 may determine the number of reviews that are desired so that the number of reviews is suitable for display on the user computing device's display or user interface. For example, in response to determining that the user computing device has a display of a certain size (e.g., in terms of pixels), the review selection service 420 may determine the number of reviews that are desired of an item by determining the number of reviews that may be displayed on the display or user interface of the computing device without requiring the user of the user computing device to scroll through the reviews.

In some further (or alternative) embodiments, the review selection service 420 may obtain information regarding the network condition between the user computing device and the network computing device 110. This network information may include information regarding the speed of the network (e.g., a packet transfer rate), the stability of the network connection, or the like. Using this network information, the review selection service 420 may determine the number of reviews that may be sent to the user computing device. For example, in response to determining that the user computing device is experiencing a relatively slow network connection, the review selection service 420 may determine that the number of reviews may be lower than if the user computing device were experiencing a faster network connection.

In some embodiments, the review selection service 420 may receive the number of reviews that are desired from the user computing device, but the review selection service 420 may modify the number of reviews based at least in part on the characteristics of the user computing device (e.g., device settings, browser settings, display size, or the like) or the network conditions between the user computing device and the review selection service 420. In an example, the review selection service 420 may receive a request for ten reviews from the user computing device. However, the review selection service 420 may determine, based at least in part on the size of the display of the user computing device, that the user computing device may be suitable for presenting only five reviews because only five reviews can be displayed at the same time. As a result, the review selection service 420 may modify the number of reviews that are desired from ten reviews to five reviews. In situations in which the review selection service 420 reduces the number of reviews that are desired to accommodate the display or network limitations of the user computing device, the review selection service 420 may enhance the overall user experience by tailoring the number of reviews that will be sent to the user computing device based at least in part on the display and network conditions of the user computing device. Further, in instances in which the review selection service 420 reduces the number of reviews based on poor network conditions (e.g., when the user computing device is a mobile device experiencing a congested cellular network or poor wireless service), the review selection service 420 may reduce the amount of network resources needed to respond to the request from the user computing device.

In block 504, the review selection service 420 may obtain a set of reviews for the item. As described (e.g., with reference to FIG. 4), the review selection service 420 may retrieve multiple reviews from local storage (e.g., from the review information 422) or from a remote data repository that includes multiple reviews of the item (e.g., the review information repository 430). In some embodiments, the set of reviews for the item may represent all available reviews of the item. Alternatively, the set of reviews for the item may include fewer than all of the available reviews of the item. For example, the review selection service 420 may select some number or percentage of the total number of available reviews from the item. Further, the review selection service 420 may select the set of reviews to represent certain characteristics or features of the reviews, such as by obtaining a set of reviews that includes a certain number of the most recent reviews rather than obtaining a set of all available reviews.

In block 506, the review selection service 420 may derive an associated collection of elements from the set of review obtained in block 504. As described (e.g., with reference to FIGS. 2A and 2B), an element may represent or indicate a characteristic, trait, attribute, feature, or the like for a review. Specifically, an element may represent a describable aspect of a review, such as, for example, a word that is included in the review, a category associated with the review (e.g., a one-star review category or a five-star review category), and various other aspects or combinations of aspects. In some embodiments, an element may be, indicate, or otherwise describe the content of a review, such as word in the review, a phrase of words in the review, a sequence of alphanumeric characteristics in the review, media (e.g., audio or video) embedded in the review, interactive features included in the review, or the like. In some additional (or alternative) embodiments, an element of review may describe indirect, non-content-based aspects of the review. For example, an element may reflect information regarding an author of a review, including the geographic location of the author, a number of reviews that the author has created, a peer-review score of the author, and the like. Further, in some embodiments, each element may be associated with a class, category, or group of elements. For example, elements related to words in a review may be in a "words" category, whereas elements related to geographic locations of review authors may be in a "location" category.

As described, an associated collection of elements may include one or more elements (or information identifying these one or more elements), as well as information that indicates relationships or associations between each element included in the associated collection of elements and one or more reviews. Specifically, the associated collection of elements may indicate whether an element is present in or otherwise related to a review. By way of a non-limiting example, an associated collection of elements may include an element that is a word and may indicate that the word is included in both a first review and a second review.

In some embodiments, the elements that are included in the associated collection of elements may be derived from the set of reviews. The review selection service 420 may analyze or process each review in the set of reviews obtained in block 504 in order to determine one or more elements that are related to at least one review in the set of reviews. In some embodiments, the review selection service 420 may identify one or more words included in the set of reviews, and the review selection service 420 may include elements representative of the identified words in the associated collection of reviews. By way of a simple example, the review selection service 420 may identify that the set of reviews includes the words "love" and "product," and the review selection service 420 may add elements representative of these words in the associated collection of elements. In such embodiments, the review selection service 420 may add elements to the associated collection of elements that are included in the reviews and may include information in the associated collection of elements to indicate the one or more reviews in the set of reviews that are associated with each element added to the associated collection of elements. The associated collection of elements may represent the characteristics, features, aspects, and the like of the reviews from which the associated collection of elements is derived. Thus, the review selection service 420 may utilize the associated collection of elements to select a subset of reviews from the set of reviews obtained in block 504 that may substantially represent the characteristics of the set of reviews, as further described herein.

In some embodiments, the review selection service 420 may perform a tokenization process on each review in the set of reviews obtained in block 504 and may utilize the tokens identified in the reviews to derive the associated collection of elements. In such embodiments, the review selection service 420 may tokenize each of the reviews into meaningful words and phrases. For example, the review selection service 420 may tokenize a sentence "This product was shipped from Germany." into the tokens "This product," "was," "shipped from Germany." The review selection service 420 may then include elements for each of these tokens in the associated collection of elements. In some embodiments, the review selection service 420 may utilize information regarding meaningful words and phrases, and this information may be specifically prepared to correspond to a language of the review (e.g., token information for English reviews, French reviews, or the like).

In some alternative embodiments of the operations performed in block 506, the review selection service 420 may derive the associated collection of elements from the set of review by including a predetermined set of elements in the associated collection of elements, determining whether any of the reviews in the set of reviews is related to any of the predetermined elements, and including information in the associated collection of elements to reflect whether (or the extent to which) any of the reviews are associated with any of the predetermined elements. In such embodiments, the review selection service 420 may utilize the associated collection of elements to select a subset of reviews from the set of reviews obtained in block 506 that may substantially represent the predetermined elements or aspects. For example, the review selection service 420 may obtain a predetermined list of words that are included in a description of an item and may add elements for those words to the associated collection of elements. The review selection service 420 may then include information in the associated collection of elements indicating the reviews in the set of reviews that do (or do not) include one or more of the words in the predetermined list of words. The review selection service 420 may then select a number of reviews that is desired from the set of reviews to substantially (or best) represent the words included in the description of the item.

In some embodiments of the operations performed in block 506, the review selection service 420 may, as part of deriving the associated collection of elements, exclude duplicative elements from the associated collection of elements. Specifically, while determining the elements represented in the set of reviews obtained in block 504, the review selection service 420 may add, to the associated collection of elements, an element associated with a review in the set only in response to determining that that element was not previously included in the associated collection of elements. For example, the review selection service 420 may add a first element related to the word "product" to the associated collection of elements, but the review selection service 420 may not add a second element that is also related to the word "product" to the associated collection of elements. In some embodiments, the review selection service 420 may perform these operations during the process of deriving the associated collection of elements. Alternatively, the review selection service 420 may add all of the elements related to the set of reviews to the associated collection of elements and then may remove duplicative elements from the associated collection of elements (e.g., as part of a post-processing step). In some embodiments, because the associated collection of elements already indicates the one or more reviews in the set of reviews that are associated with each element, storing duplicative elements in the associated collection of elements may also indicate the same relationships and, thus, may be unnecessarily redundant.

In some alternative embodiments, the associated collection of elements may include information that indicates a degree or extent to which a review in the set of reviews is associated with an element. For example, the review selection service 420 may determine that the word "delivery" is included three times in a first review and one time in a second review. In this example, the review selection service 420 may add an element that represents the word "delivery" in the associated collection of elements. The review selection service 420 may also include information or a score in the associated collection of elements that indicates that the first review includes the word "delivery" thrice and that the second review includes the word "delivery" once. In some embodiments, the information may indicate the relative representation of the element in the review. For example, the associated collection of elements may indicate that the first review's relationship with the element for the word "delivery" is "0.25" because the first review includes the word "delivery" three times and includes twelve total words (e.g., 3 "delivery" words divided by 12 total words=0.25).

In some embodiments, the review selection service 420 may remove undesirable elements from the associated collection of items or ensure that only desirable elements are included in the associated collection of items. In such embodiments, the review selection service 420 may obtain a list of characteristics that should or should not be represented as elements within the associated collection of items (e.g., a whitelist or blacklist of characteristics). Additionally (or alternatively), the review selection service 420 may generate this list of characteristics over time, such as in response to receiving user input regarding the quality of subsets of reviews that have been previously generated and provided to users. As such, as part of deriving the associated collection of elements from the set of reviews in block 506, the review selection service 420 may reference the list of characteristics to determine whether to include an element in the associated collection of elements (or, alternatively, whether to remove that element if the element has already been added). In some embodiments, the characteristics included in the list may represent characteristics that users may desire to be included in a review (e.g., embedded media) or that may not be desirable or helpful for users (e.g., common information). For example, the review selection service 420 may obtain a list of common words—e.g., "of," "the," and "it,"—and may utilize that list to remove or exclude elements related to those common words from the associated collection of elements.

In some embodiments, the review selection service 420 may identify or create elements from a media that is embedded or associated with the review. By way of an example, a review may include a video in which the author of the review discusses various aspects and opinions related to the item that is the subject of the review. In such embodiments, the review selection service 420 may parse the embedded media into one or more elements. For video, the review selection service 420 may utilize one or more of optical character recognition or computer vision to identify aspects within the video (e.g., products, objects, people, or the like), and the review selection service 420 may generate elements related to these identified aspects. In a specific example, the review selection service 420 may analyze each frame of the video and may identify one or more objects within each frame of video. The review selection service 420 may then generate elements related to these objects. For audio media, the review selection service 420 may utilize automatic speech recognition to generate textual transcriptions of the speech included in the audio data. The review selection service 420 may then generate elements related to the textual transactions, such as by creating elements related to words or phases of the textual transcription, as described above. In some embodiments, the review selection service 420 may utilize video or audio data embedded within a review to determine contextual information related to the review, such as a time of day at which the video was shot. The review selection service 420 may then generate elements related to this contextual information and include them in the associated collection of elements.

For ease of description, some embodiments of the operations performed in block 506 are described with reference to elements derived from the content of the reviews (e.g., words, phrases, textual tokens, etc.). However, in some embodiments, the review selection service 420 may additionally (or alternatively) create elements for reviews in the set of reviews that are not directly based on the content of the reviews. As described, the review selection service 420 may analyze metadata associated with a review to determine elements for the review. This metadata may indicate a time at which the review was created, an author of the review, characteristics of the author of the review, other reviews created by the author of the review, items that are similar to the item that is the subject of the review, and the like. As such, the review selection service 420 may utilize this metadata to create elements that go beyond the content of the review, and the review selection service 420 may include these elements in the associated collection of elements.

In some embodiments of the operations performed in block 506, the review selection service 420 may assign or associate an element value with one or more of the elements in the associated collection of elements. In some embodiments, each element in the associated collection of elements may correspond with an element value of one such that the marginal utility value of a review is equal to the number of elements related to that review. However, in some embodiments, the element value of an element may be any positive or non-positive number. In such embodiments, the element value of an element may represent an importance or desirability of providing a review related to the element to a user. By way of an example, an element associated with a profane word may have a negative element value, which may reflect a desire to avoid providing a review having this item to a user. In addition to assigning element values to elements in the associated collection of elements, the review selection service 420 may assign weight values to one or more of the elements. In such embodiments, the review selection service 420 may determine a weight value for an element based on one or more criteria or combinations of criteria. For example, the review selection service 420 may identify elements included in one of multiple categories of elements (e.g., "word" elements or "location" elements). The review selection service 420 may then assign or associate a weight with an element based on the element category to which the element belongs. In such embodiments, the review selection service 420 may utilize the weight values for various purposes. For example, the review selection service 420 may utilize weights such that the total element values for all elements in one category is equal to the total element values for all elements in another category. In some embodiments, the review selection service 420 may receive information regarding the user interface or display information of a user computing device requesting reviews. In such embodiments, the weight of an element may be based at least in part on, an amount of space required to display the element on the user interface of the user computing device, an amount of available space to display the element on the user interface of the computing device, a size of the user interface of the computing device, or a number of items that included the element. In some embodiments, the review selection service 420 may utilize user preferences or other information to determine weight values that will modify the element value of that element. For example, the review selection service 420 may receive a preference for a certain word in a request received from a user computing device. As such, the review selection service 420 may apply a positive weight (e.g., a positive offset or scalar) that may increase the base element value of an element associated with the preferred word.

Once the associated collection of elements is derived in block 506, the review selection service 420 may begin selecting a set of representative reviews from the set of reviews obtained in block 504, such as by performing operations as described herein with reference to blocks 508-516. Specifically, in some embodiments, the review selection service 420 may, for each review of the set of reviews, determine a marginal utility value for the review based at least in part on one or more elements in the associated collection of elements that are related to the review, in block 508.

In some embodiments, the review selection service 420 may determine a number of elements in the associated collection of elements that are associated with each review in the set. For example, the review selection service 420 may determine that a first review in the set is associated with a total of three elements (e.g., elements related to the words "bought," "product," and "satisfied") and that a second review is associated with two elements (e.g., elements related to the words "satisfied" and "very"). In this example, the marginal utility value of the first review may be equal to three, and the marginal utility value of the second review may be equal to two. In some embodiments, the review selection service 420 may determine the marginal utility value of a review by adding together all of the element values of elements related to the review. In such embodiments, the review selection service 420 may also apply weight values to element values for individual elements to yield a weight element value, and the review selection service 420 may then determine the marginal utility value of the review by adding together the weighted element values for all of the elements related to the review.

In block 510, the review selection service 420 may include the review with the highest marginal utility value in a set of selected reviews. As described, the review having the highest marginal utility value may correspond with the review that is associated with the greatest number of elements in the associated collection of elements or the review that is associated with the highest sum of element values or weighted element values.

In block 512, the review selection service 420 may remove elements in the associated collection of elements that are associated with the review added to the set of selected reviews. In some embodiments of the operations performed in block 512, the review selection service 420 may remove, from the associated collection of elements, fields, rows, or other data associated with the elements associated with the review added to the set of selected reviews. By way of an example, the review selection service 420 may delete rows from a table representation of the associated collection of elements (e.g., as illustrated in FIG. 2B). While some descriptions refer to the review selection service 420 removing an element from the associated collection of elements, in some embodiments, instead of explicitly removing the elements in block 512, the review selection service 420 may modify the element values or weight values associated with those elements, such as by setting those values to zero. Additionally, or alternatively, the review selection service 420 may adjust the weight values or element values for elements, in the associated collection of elements, that are not related to the review that is selected. For example, the review selection service 420 may determine updated weight values for elements remaining based in the associated collection of elements based on the elements that were removed. Thus, for ease of description, the review selection service 420 may be generally referred to as modifying an element in the associated collection of element either by modifying a value of the element or by removing the element from the associated collection of elements.

In some embodiments, the review selection service 420 may remove the review that is included in the set of selected reviews from the set of reviews, in block 514. In such embodiments, once a review is added to the set of selected reviews, it may not be added to the set of selected reviews again. As such, the review selection service 420 may remove the selected review in order to reduce the processing resources required to determine an updated marginal utility value for the set of reviews that are remaining in the set of reviews.

In decision block 516, the review selection service 420 may determine whether the number of reviews included in the set of selected reviews is less than the number of reviews that are desired obtained in block 502. In response to determining that the number of reviews included in the set of selected reviews is less than the number of reviews that are desired (e.g., decision block 516="YES"), the review selection service 420 may repeat the above operations in a loop by, for each review in the set of reviews, determining an updated marginal utility value for the review based on the (remaining) elements included in the associated collection of elements that are associated with the review. In embodiments in which a selected review is removed from the set of reviews, the review selection service 420 may repeat the above operations for the remaining reviews in the set of reviews.

In response to determining that the number of reviews included in the set of selected reviews is equal to the number of reviews that are desired (e.g., decision block 516="NO"), the review selection service 420 may provide the set of selected reviews to another computing device, in block 518. In some embodiments of the operations performed in block 518, the review selection service 420 may respond to a request from the other computing device for the number of reviews that are desired by sending the set of selected reviews to the other computing device. In response, the other computing device may display or render the set of selected reviews for the user of the other device on a display or user interface.

Because the review selection service 420 selects a review having the highest marginal utility value as a result of each iteration of the above operations, the set of selected reviews may be ordered based on the marginal utility values of the reviews included in the set. In such embodiments, the set of selected reviews may be ordered in such a manner that the first ordered review in the set may have the highest likelihood of being useful or desirable to a user, the second review may have the second highest likelihood, and so forth. However, in some embodiments, the review selection service 420 may rank the reviews in the set of selected reviews according to one or more criteria or combinations of criteria that may or may not have been utilized when determining the marginal utility values of the reviews, as described above. By way of a non-limiting example, the review selection service 420 may utilize a helpfulness score associated with each of the reviews in the set of selected reviews to reorder those reviews in the set.

In some embodiments of the operations performed in block 518, the review selection service 420 may send the set of selected reviews to the other computing device as part of a user interface or as part of information that the other computing device may use to generate a user interface. Particularly, in some embodiments, the review selection service 420 may generate and provide user interface information to the other computing device, and the other computing device may utilize the user interface information to generate a user interface that is displayed on the other computing device. In a non-limiting example, the review selection service 420 may generate user interface information (e.g., HTML code) that may be used on the user computing device to generate a user interface in a browser application. Alternatively, or additionally, the review selection service 420 may generate all or part of a user interface and send the user interface or the portion of the user interface to the other computing device, and the user computing device may display the user interface to the user. By way of a non-limiting example, the user interface may be a network page or a portion of a network page (e.g., a web page) that may include the reviews, and the other computing device may receive and display the user interface or the portion of the user interface.

In some embodiments, the review selection service 420 may generate the user interface to feature the reviews in the set of selected reviews based on their ranks. For example, the user interface may include the review in the set of selected reviews having the highest marginal utility value at the top of the user interface, whereas another review having the lowest marginal utility value may be positioned at the bottom of the user interface. Further, in some embodiments, the review selection service 420 may generate the user interface or the user interface information based at least in part on information received from the other computing device about the display of the other computing device. As such, the review selection service 420 may customize the user interface or user interface information to feature the set of selected reviews in a manner that is suitable for the particular display of the other computing device (e.g., a display of a small mobile phone or a display of a large monitor of a desktop computer).

In some embodiments, the review selection service 420 may send the set of selected reviews to the other computing device in one of various formats. As noted above, the review selection service 420 may send the set of selected reviews to the other computing device for display on a user interface or display of the other computing device. Additionally (or alternatively), the review selection service 420 may send the set of selected reviews to the other computing device in the form of audio data for presentation to a user through an audio interface (e.g., a speaker). Additionally, or alternatively, the review selection service 420 may prepare the set of selected reviews for use by a tactile display (e.g., for the visually impaired).

In some embodiments, the review selection service 420 may send the set of selected reviews to another computing device in block 518, and the other computing device may send the set of selected reviews to yet another computing device for presentation (e.g., display or audio playback). For example, the review selection service 420 may send the set of selected reviews to a mobile device (e.g., a smart phone), and the mobile device may provide the set of selected reviews to another device (e.g., a smart watch or separate display device) for display of the set of selected reviews. In such embodiments, the other computing device may send information regarding the device that will ultimately present the set of selected reviews, and the review selection service 420 may determine the number of reviews that are desired (e.g., in block 502) based at least in part on this information.

The review selection service 420 may then terminate operations of the routine 500.

In some embodiments, the review selection service 420 may perform the operations in blocks 504 and 506 in advance of selecting the subset of reviews from the set of reviews. Specifically, the operations performed in blocks 504 and 506 may be considered "pre-processing" steps as the review selection service 420 may preemptively derive one or more associated collections of elements based on one or more sets of reviews at any time before the these associated collections of elements are needed to select a set of representative reviews. For example, the review selection service 420 may have derived the associated collection of elements from the set of reviews (e.g., as described with reference to the operations performed in block 506) prior to receiving a request from a user computing device requesting a subset of reviews from the set of reviews. As such, the review selection service 420 may quickly respond to requests because the review selection service 420 may utilize the associated collection of elements to respond to the request without having to create the associated collection of elements subsequent to receiving the request.

In some embodiments, the process of selecting a set of representative reviews from a set of reviews (e.g., as described with reference to the routine 500) may be generally described using the following algorithm:

Input k, R(q)
Output S
S=0
generate associated collection of elements B

```
while |S|<k do
    determine the marginal utility values for each r∈R
    select rᵢ∈R that has the highest marginal utility value
    S=S∪{r}
        remove/mark elements in rᵢ from B
        remove rᵢ from R
end while
return S
```

The above algorithm may generally be described with reference to the following pseudocode:

```
obtain a set of reviews for an item (e.g., R(q)), wherein
    each review of the set of reviews (e.g., r∈R) is a set of
    one or more elements;
obtain a number of reviews that are desired;
initialize an empty set of selected reviews (e.g., S);
initialize an empty associated collection of elements (e.g.,
    B);
//GENERATE THE ASSOCIATED COLLECTION OF
    ELEMENTS
for each review of the set of reviews:
{
    determine a set of elements associated with the item
        that are not included in the associated collection of
        elements;
    add, to the associated collection of elements, the set of
        elements that are not included in the associated
        collection of elements;
}//end for loop
//SELECT A SET OF REPRESENTATIVE REVIEWS
while the number of reviews in the set of selected reviews
    is less than the number of reviews that are desired (e.g.,
    |S|<k):
{
    for each review in the set of reviews (e.g., r∈R(q)):
    {
        determine the marginal utility value of the review
            based on the elements in the associated collection
            of elements associated with the review;
    }//end for loop
    select the review in the set of reviews with the highest
        marginal utility value;
    add the review with the highest marginal utility value
        to the set of selected reviews (e.g., S=S∪{rᵢ})
    for each element in the associated collection of ele-
        ments associated with the review with the highest
        marginal utility value:
    {
        remove, mark, or modify the element from the
            associated collection of elements
    }//end for loop
    remove the review having the highest marginal utility
        value from the set of reviews;
}//end while
return the set of selected reviews.
```

The above algorithm and/or pseudocode may be implemented with embodiments of a review selection service operating on a computing device (e.g., the review selection service 420 of the network computing device 110 as described with reference to FIG. 4). In such embodiments, by utilizing the above algorithm, the review selection service 420 may find a subset of reviews in a set of reviews that, for a number of reviews that are desired, maximizes the number of elements represented in the resulting subset of reviews, as represented by the following equation:

$$\left| \bigcup_{r_i \in S} r_i \right|$$

Using the above algorithm, the review selection service 420 may select a subset of reviews that approximates the optimal solution of the above equation in polynomial time, thereby reducing the amount of time, processing resources, and power required to select the subset of reviews according to the above equation.

For ease of description, the review selection service 420 is described as performing various operations described with reference to the routine 500. However, in some embodiments, the above operations may be performed by one or more computing devices. By way of a non-limiting example, a first computing device (e.g., the network computing device 110) may obtain the number of reviews that are desired from a second computing device in block 502, obtain a set of reviews in block 504, and derive an associated collection of elements from the set of reviews in block 506. In such embodiments, the first computing device may provide the associated collection of elements to the second computing device. In response, the second computing device may perform various operations (e.g., as described with reference to blocks 508-516) in order to select the set of representative reviews using the associated collection of elements.

Figure 6:
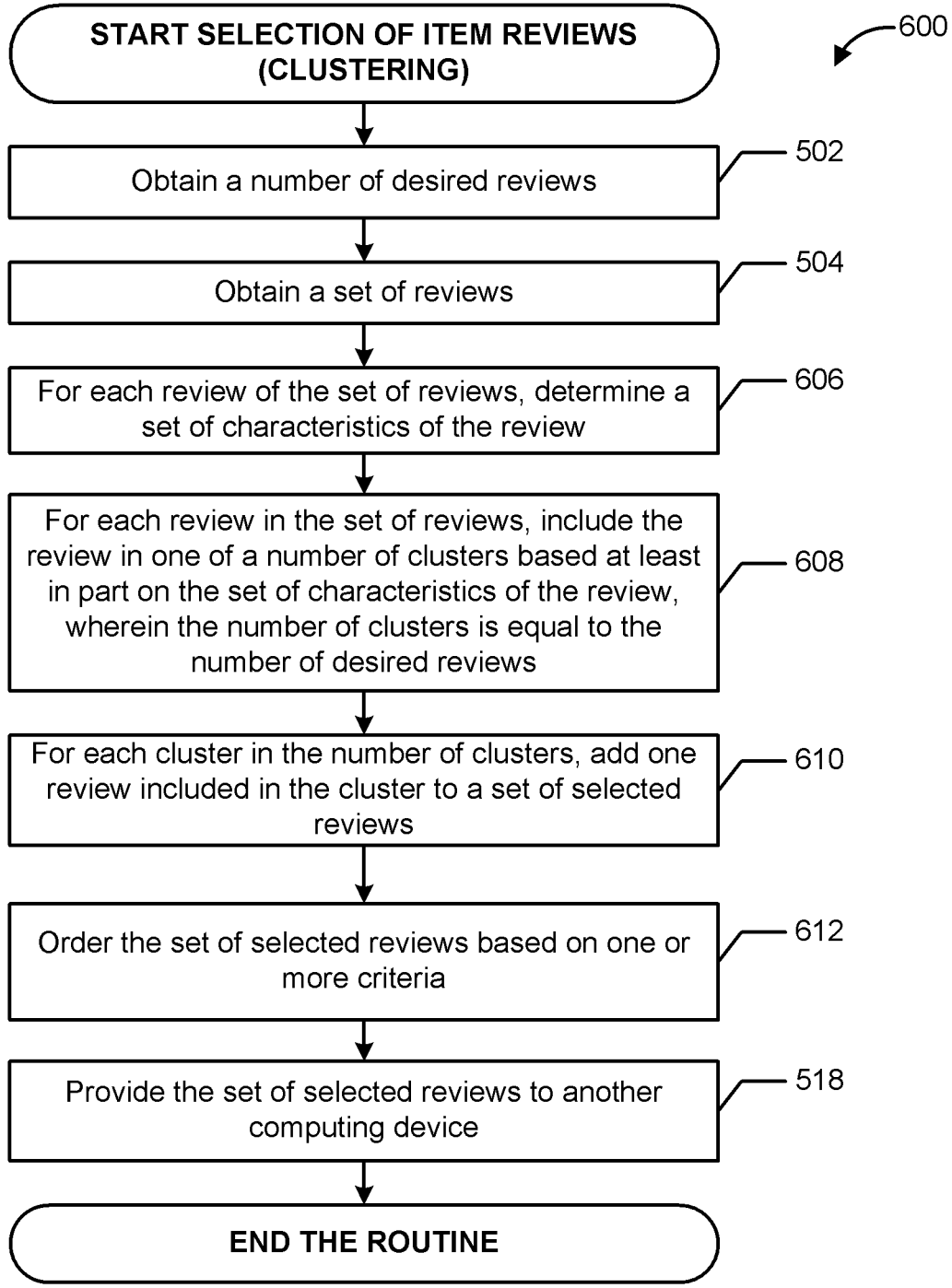
FIG. 6 is a flow diagram depicting an illustrative computer-implemented method that may be implemented by the network computing device shown in FIG. 4 to select a set of representative reviews from a set of reviews using a clustering-selection strategy.

FIG. 6 is a flow diagram depicting an illustrative computer-implement method or routine 600 for selecting a set of representative reviews from a set of reviews, according to some embodiments. The routine 600 may be implemented by a review selection service operating on a computing device (e.g., the review selection service 420 of the network computing device 110 as described with reference to FIG. 4).

The review selection service 420 may obtain a number of reviews that are desired for an item in block 502. The review selection service 420 may also obtain a set of reviews, in block 504. In some embodiments, the review selection service 420 may obtain the number of reviews that are desired and obtain the set of reviews by performing operations similar to the operations described with reference to blocks 502 and 504 of the routine 500 (e.g., as described with reference to FIG. 5).

In block 606, the review selection service 420 may, for each review of the set of reviews, determine a set of characteristics of the review. The characteristics of a review may be similar or different to the characteristics utilized to derive elements related to the review (e.g., as described with reference to FIG. 5). In some embodiments, a set of characteristics related to a review may indicate or describe content-based characteristics of the reviews in the set of reviews. For example, the review selection service 420 may identify the words, tokens, phrases, embedded media, or the like that are included in each review. Additionally (or alternatively), the set of characteristics of a review may include non-content-based characteristics of the review, such as characteristics of the author of the review (e.g., location of the author, a number of other reviews that are associated with the review, and the like). Further, without limiting the generality of the characteristics of reviews that the review selection service 420 may determine in block 604, the review selection service 420 may further determine social characteristics of the reviews. For example, the review selection service 420 may determine a number of user that have indicated that the review has been helpful (or not helpful), a number of users that have included a link to the review in their user profiles, and various other social characteristics.

In block 608, the review selection service 420 may, for each review in the set of reviews, include the review in one of a number of clusters based at least in part on the set of characteristics of the review. According to some embodiments of the operations performed in lock 608, the review selection service 420 may utilize one or more clustering algorithms in order to include each review in the set of reviews into one of a number of clusters. For example, the review selection service 420 may utilize the set of characteristics related to a review to determine a category of the review. The review selection service 420 may determine the category explicitly from the set of characteristics of the review. For example, the review selection service 420 may determine that a characteristic of the review is that the review has been assigned an average of four out of five stars by users. As such, the review selection service 420 may include the review in a cluster of reviews that includes other four-out-of-five-star reviews. Alternatively (or additionally), the review selection service 420 may derive or infer a category of a review based on the set of characteristics related to that review. For example, the review selection service 420 may determine that an item that is the subject of the review includes five features. The review selection service 420 may then analyze the content of the review (e.g., the words in the review) to identify one feature of the five features that the review discusses the most. The review selection service 420 may then include the review in a cluster of reviews that is most relevant to that one feature out of the five features of the item.

In some embodiments (e.g., as described with reference to FIGS. 3A and 3B), the review selection service 420 may generate a representation of the review based on the set of characteristics associated with the review for use with one or more clustering algorithms. The representation may be a multi-dimensional representation of the review, such as an indexed array of values or a feature vector. This representation of the review may include information regarding the set of characteristics of the review and a value of each characteristic in the set. For example, a feature vector representation of a review may include information for a first characteristic of the review (e.g., a "helpfulness" score) and a value for that first characteristic (e.g., 0.9), and the feature vector representation may also include information for a second characteristic of the review (e.g., a number of words) and a value for that second characteristic (e.g., 150 words). The review selection service 420 may determine the similarity or differences between the representations of the reviews in the set obtained in block 504 in order to determine how to divide the set of reviews into the different clusters. In some embodiments, the review selection service 420 may determine the Euclidean distance between the representations of the reviews in order to determine how similar or different the representations of the reviews are to each other. The review selection service 420 may then group together the most similar reviews into separate clusters. In some embodiments, the review selection service 420 may generally perform the above operations as part of implementing one of various clustering algorithms, such as a hierarchical clustering algorithm, a k-means clustering algorithm, an expectation-maximization algorithm, or a biclustering algorithm as would be understood by one of ordinary skill in the art.

The review selection service 420 may, for each cluster of the number of clusters, add one review included in the cluster to a set of selected reviews, in block 610. In some embodiments, the number of clusters may be equal to the number of reviews that are desired obtained in block 504. Specifically, in order to select a number of reviews that are desired from the set of reviews obtained in block 504, the review selection service 420 may select only one review from each cluster in order to select the number of reviews that are desired, as further described. Further, because the review selection service 420 organizes each cluster of reviews based on the similarities of the members of each cluster, selecting one review from each cluster may result in a set of selected reviews that represents each of the different clusters of reviews while minimizing the likelihood that multiple reviews will share similar characteristics that may be duplicative.

In some embodiments of the operations performed in block 610, the review selection service 420 may order the set of selected reviews by determining a utility value for each of the reviews in the set of selected reviews. In such embodiments, the utility value of a review may reflect the expected likelihood that the review will be helpful or desirable to a user. In some embodiments, the review selection service 420 may utilize different characteristics or criteria than those used to organize the set of reviews into clusters. Specifically, the review selection service 420 may utilize a first set of characteristics or criteria to cluster the reviews based on the structure of the reviews (e.g., the content-based characteristics of the reviews). Thus, the review selection service 420 may then organize or order the selected reviews in each cluster based on different characteristics, such as the social characteristics of the reviews. The review selection service 420 may then select the review in the cluster having the highest utility value among the reviews in that cluster of reviews. By way of a non-limiting example, the review selection service 420 may cluster the set of reviews based on the words included in those reviews, such as by clustering reviews sharing one or more words together. The review selection service 420 may then order the reviews in each cluster based on a helpfulness score associated with each of the reviews. The review selection service 420 may then select the review in each cluster having the highest helpfulness score. In another example, the review selection service 420 may determine the utility scores of each of the reviews in a cluster based at least in part on the amount of space that would be required to present each of the reviews on a user interface. In space on the user interface is limited, the review selection service 420 may determine that reviews that require less space on the user interface may have higher utility values and thus may select the review from each cluster that requires the least amount of space on the user interface.

In some embodiments, the review selection service 420 may apply a weight to a utility value of a review when identifying a review in a cluster having the highest utility value. For example, rather than utilizing the amount of space a review may require for presentation on a user interface as the utility value of the review, the review selection service 420 may determine the utility value of the review based on other characteristics or criteria of the review (e.g., based on non-content metadata associated with the review) and may utilize the presentation requirements of the review as a weight to adjust the utility value of the review. By way of a further example, the review selection service 420 may apply a weight that is determined from an amount of space required to display the item on a user interface of the computing device, an amount of available space to display the item on the user interface of the computing device, or a size of the user interface of the computing device.

In some embodiments, the review selection service 420 may order or rank the set of selected reviews determined in block 608 based on one or more criteria, in block 612. In some embodiments, the set of criteria may be the same or similar to the characteristics that the review selection service 420 utilizes to sort the set of reviews into clusters as part of performing operations in block 608. As such, the review selection service 420 may determine a second utility for each review in the set of selected review based on these other characteristics.

In block 518, the review selection service 420 may provide the set of selected reviews to another computing device. In some embodiments, the review selection service 420 may perform operations in block 518 that are similar to or the same as the operations described with reference to block 518 of the routine 500 (e.g., as described with reference to FIG. 5). In some embodiments, the review selection service 420 may provide the ordered set of selected reviews to the other computing device for presentation in the order determined in block 612. The review selection service 420 may then terminate operations of the routine 600.

In some embodiments, the process of selecting a set of representative reviews from a set of reviews (e.g., as described with reference to the routine 600) may be generally described using the following algorithm as expressed in pseudo code:

obtain a set of reviews for an item;
obtain a number of reviews that are desired (e.g., for presentation);
set k=number of reviews that are desired;
initialize an empty set of selected reviews;
//START PSUEDO CODE
//GENERATE REPRESENTATIONS OF THE ITEMS
for each review of the set of reviews:
{
    determine a first set of characteristics of the review;
    generate a multi-dimensional representation of the review;
}//end for loop
//GENERATE CLUSTERS OF REVIEWS
select k starting values in the multi-dimensional space;
create k clusters corresponding to the k random values;
for each review in the set of reviews, assign the review to one of the k clusters; do:
{
    for each cluster in the k clusters, adjust the starting value of the cluster based on the reviews assigned to the cluster;
    for each review:
    {
        determine whether the review should be reassigned to another cluster;
        if(reassign="YES"), reassign the review to another cluster;
    }
}
while(at least one review is reassigned to another cluster);
//SELECT THE REVIEWS TO ADD TO THE SET OF SELECTED REVIEWS
for each cluster of reviews:
{
    for each review in the cluster:
    {
        determine a second set of characteristics of the review that is different than the first set of characteristics of the review;
        determine the utility value of the review based at least in part on the second set of characteristics;
    }
    select the review having the highest utility value;
    add the selected review to the set of selected reviews;
}
return the set of selected reviews.
//END PSUEDO CODE The above pseudocode may be implemented with embodiments of a review selection service operating on a computing device (e.g., the review selection service 420 of the network computing device 110 as described with reference to FIG. 4). In such embodiments, by utilizing the above algorithm, the review selection service 420 may find a subset of reviews in a set of reviews that, for a number of reviews that are desired, maximizes the diversity of the characteristics represented in the resulting subset of reviews. Specifically, using the above algorithm, the review selection service 420 may select a set of representative reviews in polynomial time, thereby reducing the amount of time, processing resources, and power required to select the subset of reviews.

For ease of description, the review selection service 420 is described as performing various operations described with reference to the routine 600. However, in some embodiments, the above operations may be performed by one or more computing devices. By way of a non-limiting example, a first computing device (e.g., the network computing device 110) may obtain the number of reviews that are desired from a second computing device in block 502, obtain a set of reviews in block 504, determine characteristics for each of the reviews in the set in block 606, and organize the reviews in the set into clusters based on their respective characteristics, in block 608. In such embodiments, the first computing device may provide the clusters of reviews to the second computing device. In response, the second computing device may perform various operations (e.g., as described with reference to blocks 610, 612, and 518) in order to select the set of representative reviews. In some embodiments, the first computing device may utilize a first set of characteristics related to the reviews to create the clusters of reviews, and the second computing device may utilize a second set of characteristics distinct from the first set of characteristics. For example, the second computing device may include private or personal information for the user of the second computing device, and the second computing device may utilize that personal or private information to select the reviews from the clusters without revealing that information to the first computing device, thereby enhancing security and privacy of the information managed by the second computing device.

Figure 7:
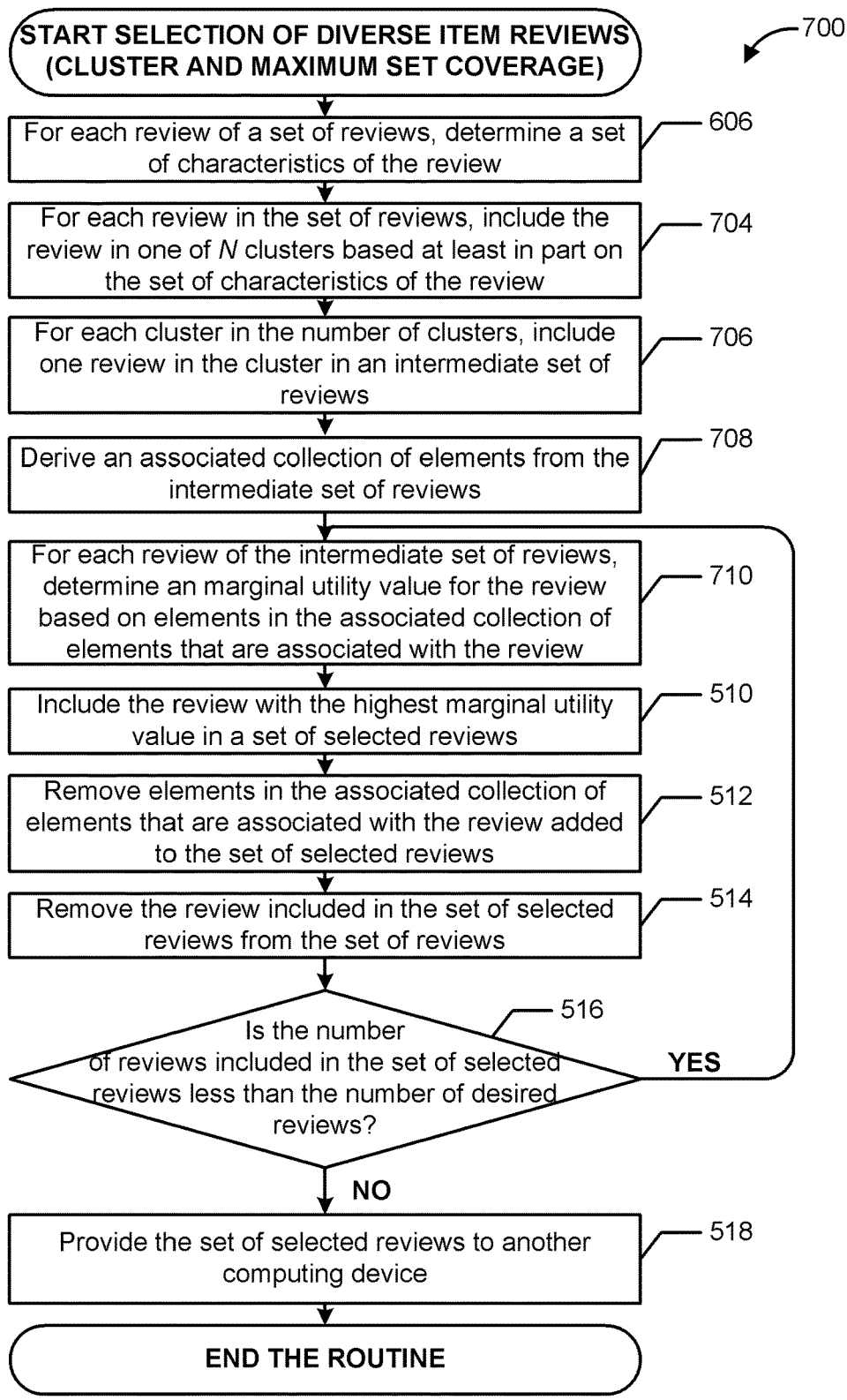
FIG. 7 is a flow diagram depicting an illustrative computer-implemented method that may be implemented by the network computing device shown in FIG. 4 to select a set of representative reviews from a set of reviews using aspects of both a maximum-set-coverage selection strategy and a clustering-selection strategy.

FIG. 7 is a flow diagram depicting an illustrative computer-implement method or routine 700 for selecting a set of representative reviews from a set of reviews, according to some embodiments. The routine 700 may be implemented by a review selection service operating on a computing device (e.g., the review selection service 420 of the network computing device 110 as described with reference to FIG. 4). As described (e.g., with reference to FIGS. 5 and 6), the review selection service 420 may select a representative set of reviews using a maximum-set-coverage selection strategy or a clustering-selection strategy. In some embodiments, the review selection service 420 may perform aspects of both the maximum-set-coverage selection strategy and the clustering-selection strategy to select a representative set of reviews. Generally described, the review selection service 420 may determine clusters of reviews according to a clustering-selection strategy (e.g., as described with reference to the routine 600) and may include one review from each cluster into an intermediate set of reviews. The review selection service 420 may then select a set of reviews from the intermediate set of reviews according to the maximum-set-coverage selection strategy, as further described herein.

In block 606, the review selection service 420 may, for each of a set of reviews, determine a set of characteristics of the review. In some embodiments, the review selection service 420 may perform operations in block 606 similar to the operations performed in block 606 of the routine 600 (e.g., as described with reference to FIG. 6). For example, the review selection service 420 may determine a first set of content-based characteristics for each review, such as a number of words included in the review, whether video or audio is included in the review, and the like.

In block 704, the review selection service 420 may, for each review in the set of reviews, include the review in one of N clusters based at least in part on the set of characteristics of the review, as determined in block 606. In such embodiments, the number of reviews that are desired (e.g., for presentation) may be less than N. In block 706, for each cluster of the number of clusters, the review selection service 420 may include one review in the cluster in an intermediate set of reviews. Specifically, the review selection service 420 may create more clusters than the number of reviews that are desired. As such, by including one review from each of the N clusters into the intermediate set of reviews, the review selection service 420 may utilize a maximum-set-coverage selection strategy to select the desired number of review from the intermediate set of reviews.

Specifically, in block 708, the review selection service 420 may generate an associated collection of elements from the intermediate set of reviews, in block 708. In some embodiments, the operations performed in block 708 may be similar to operations performed in block 506 of the routine 500 (e.g., as described with reference to FIG. 5). In some embodiments, the review selection service 420 may utilize the set of characteristics determined for each review in block 606 to derive an associated collection of elements from the intermediate set of reviews. For example, the review selection service 420 may, for each review, determine the words or phrases included in the review and may include elements related to those words in the associated collection of elements, as well as information indicating that the review is associated with those elements.

In block 710, the review selection service 420 may, for each review of the intermediate set of reviews, determine a marginal utility value for the review based at least in part on elements in the associated collection of elements that are associated with the review. In some embodiments, the review selection service 420 may perform the operations of block 710 by performing operations similar to the operations described with reference to block 508 of the routine 500 (e.g., as described with reference to FIG. 5). For example, the review selection service 420 may determine a number of elements that are associated with each review, wherein the marginal utility value is equal to or based at least in part on the number of elements associated with the reviews.

The review selection service 420 may then perform operations similar to the operations described with reference to blocks 510, 512, 514, and 516 of the routine 500 (e.g., see FIG. 5). Specifically, the review selection service 420 may include the review having the highest marginal utility value in a set of selected reviews, in block 510. The review selection service 420 may also remove elements in the associated collection of elements that are associated with the review added to the set of selected reviews, in block 512. The review selection service 420 may also remove the review included in the set of selected reviews from the set of reviews, in block 514. The review selection service 420 may also determine whether the number of reviews included in the set of selected reviews is less than the number of reviews that are desired, in decision block 516.

In response to determining that the number of reviews included in the set of selected reviews is less than the number of reviews that are desired (e.g., decision block 516="YES"), the review selection service 420 may perform the above operations in a loop by again determining, for each review of the intermediate set of reviews, a marginal utility value for the review based at least in part on the (remaining) elements in the associated collection of elements that are associated with the review, in block 710. The review selection service 420 may continue performing the operations of blocks 710, 510, 512, and 516 in a loop until the number of reviews included in the set of selected reviews is equal to the number of reviews that are desired.

Accordingly, in response to determining that the number of reviews included in the set of selected reviews is equal to the number of reviews that are desired (e.g., decision block 516="NO"), the review selection service 420 may provide the set of selected reviews to another computing device, in block 518. In some embodiments, the review selection service 420 may perform operations in block 518 that are similar to the operations performed in block 518 in the routines 500 and 600 (e.g., as described above with reference to FIGS. 5 and 6).

By way of some non-limiting examples, the review selection service 420 may perform the routine 700 in situations in which the set of review includes numerous features and elements. Specifically, in such situations, the review selection service 420 may organize the reviews into clusters based on features to ensure that those features are likely to be represented in the set of reviews presented to the user. The review selection service 420 may then, from the clusters, select the intermediate set of reviews, from which the review selection service 420 may capitalize on the reduced total number of reviews for which the review selection service 420 must derive an associated collection of elements. As such, the review selection service 420 may then quickly utilize the maximum-set-coverage selection strategy to select the final set of representative reviews from the intermediate set of reviews.

Figure 8:
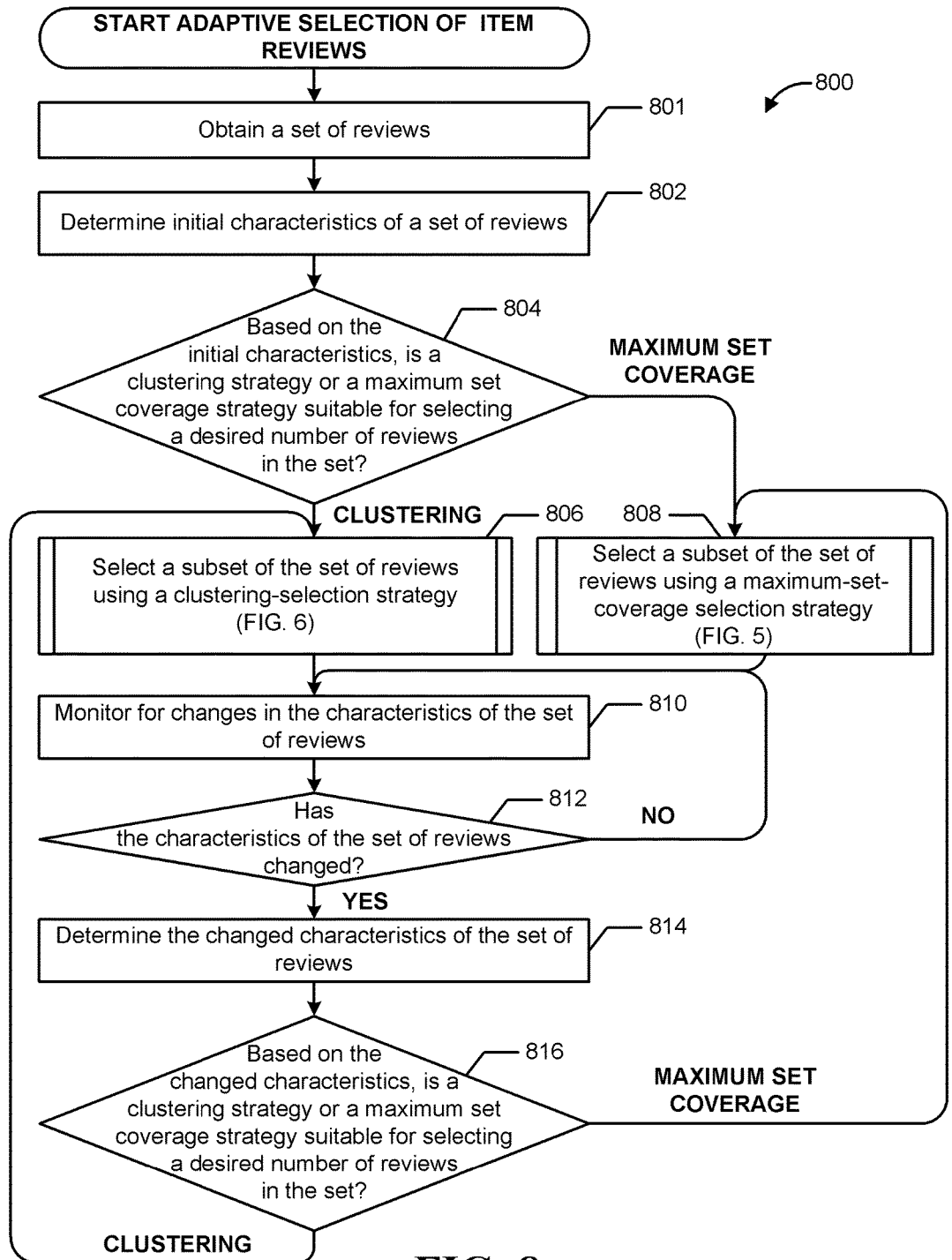
FIG. 8 is a flow diagram depicting an illustrative computer-implemented method that may be implemented by the network computing device shown in FIG. 4 to select a set of representative reviews from a set of reviews dynamically.

FIG. 8 is a flow diagram depicting an illustrative computer-implement method or routine 800 for selecting a set of representative reviews from a set of reviews, according to some embodiments. The routine 800 may be implemented by a review selection service operating on a computing device (e.g., the review selection service 420 of the network computing device 110 as described with reference to FIG. 4). In some embodiments, the review selection service 420 may dynamically determine whether to select a set of representative reviews from a set of review using a maximum-set-coverage selection strategy or a clustering-selection strategy. Specifically, one selection strategy or the other may be particularly suitable for certain situations, as further described herein.

The review selection service 420 may begin performing the operations the routine 800 in block 801 by obtaining a set of reviews, such as by performing operations similar to the operations described with reference to block 504 of the routines 500 and 600 (see FIGS. 5 and 6). In some embodiments (not shown), the review selection service 420 may obtain the set of reviews in response to receiving a request from a user computing device for set of representative reviews that are selected from the set of reviews.

In block 804, the review selection service 420 may determine initial characteristics of the set of reviews. In some embodiments, the initial characteristics may correspond to a number of reviews included in the set of reviews. For example, the review selection service 420 may determine whether the number of reviews in the set of reviews satisfies (e.g., is greater than or equal to) a threshold number of reviews. In such embodiments, the threshold number of reviews may be a predetermined number of reviews. In alternative (or additional) embodiments, the initial characteristics may include contextual information related to the set of reviews, such as a last absolute or relative time that the review selection service 420 selected a set of representative reviews from the set of reviews.

In decision block 804, the review selection service 420 may determine, based on the initial characteristics determined in block 802, whether a clustering-selection strategy or a maximum-set-coverage selection strategy is suitable for selecting a desired number of reviews in the set of reviews obtained in block 504. Referring to the above example, the review selection service 420 may determine whether the number of reviews in the set of reviews satisfies the threshold number of reviews. Specifically, the review selection service 420 may utilize a maximum-set-coverage selection to select a set of representative reviews from the set of reviews when the number of reviews in the set of reviews is less than the threshold because the maximum-set-coverage strategy may be relatively more efficient (e.g., require less time) than utilizing the clustering-selection strategy for relatively low numbers of reviews. On the other hand, the review selection service 420 may determine that the clustering-selection strategy is more suitable for selecting the representative set of reviews in the event that the number of reviews in the set of reviews satisfies the threshold number because the clustering-selection strategy may, in some instances, be more efficient when selecting reviews from a large number of reviews with many different features.

In some embodiments, the review selection service 420 may determine whether to utilize the maximum-set-coverage selection strategy or the clustering-selection strategy based at least in part on information regarding the characteristics of the content of the set of reviews and contextual information regarding the set of reviews. In such embodiments, the review selection service 420 may determine the initial characteristics of the set of reviews based on content-based characteristics and contextual characteristics of the set of items. By way of an example, a content-based characteristic may include characteristics (e.g., the amount) of the words, phrases, media, and the like that are included in the reviews. Contextual characteristics may include information regarding the features and attributes surrounding the reviews, such as information regarding the authors of the reviews and the like or the total number of features related to the set of reviews. In some embodiments, the review selection service 420 may determine a first selection-strategy score based at least in part on the content-based characteristics of the set of items and may determine a second selection-strategy score based at least in part on the contextual characteristics of the set of items. In such embodiments, the review selection service 420 may determine to utilize the maximum-set-coverage selection strategy in response to determining that the first selection-strategy score is greater than or equal to the clustering-selection strategy.

In some embodiments, the review selection service 420 may determine whether the clustering-selection strategy or the maximum-set-coverage selection strategy is more suitable based on the selection strategy that was last utilized. Specifically, in such embodiments, the preliminary characteristics may include information regarding the last strategy that was utilized to select a set of representative reviews. Specifically, while the review selection service 420 may utilize each of the maximum-set-coverage strategy and the clustering-selection strategy to select a set of representative reviews form the same input set of reviews, the output from each strategy may vary. As such, the review selection service 420 may alternate or otherwise vary the selection strategy utilized based on previous utilized strategies in order to select different sets of representative reviews. This variation may, among other benefits, improve the overall diversity of reviews that are presented to users.

In response to determining that a maximum-set-coverage selection strategy is more suitable for selecting a desired number of reviews in the set of reviews (e.g., decision block 804="MAXIMUM SET COVERAGE"), the review selection service 420 may select a subset of the set of reviews using a maximum-set-coverage selection strategy, in block 808. In some embodiments, the operations performed in block 808 may correspond with the operations described with reference to the routine 500 (see FIG. 5). As such, the review selection service 420 may perform the operations in block 808, for example, by performing the operations described with reference to blocks 502-518 of the routine 500.

In response to determining that a clustering-selection strategy is more suitable for selecting a desired number of reviews in the set of reviews (e.g., decision block 804="CLUSTERING"), the review selection service 420 may select a subset of the set of reviews using a clustering selection strategy, in block 806. In some embodiments, the operations performed in block 808 may correspond with the operations described with reference to the routine 600 (see FIG. 6). As such, the review selection service 420 may perform the operations in block 808, for example, by performing the operations described with reference to blocks 502, 504, 606, 608, 610, 612, and 518 of the routine 600.

In response to selecting a subset of the set of reviews using a clustering selection strategy in block 806 or in response to selecting a subset of the set of reviews using a maximum-set-coverage selection strategy in block 808, the review selection service 420 may monitor for changes in the characteristics of the set of reviews, in block 810. In some embodiments, the review selection service 420 may monitor for, for example, a change in the number of reviews included in the set of reviews (e.g., in response to reviews being added or deleted), a change in or edit to the content of the review, a change in metadata or contextual data associated with a review (e.g., a change in the user profile of the author of the review), or the like.

In decision block 812, the review selection service 420 may determine whether the characteristics of the set of reviews have changed. In some embodiments, the review selection service 420 may determine that a change has occurred by comparing a current version a review (or the set of reviews as a whole) with a previous version. In response to determining that the characteristics of the set of reviews have not changed (e.g., decision block 812="NO"), the review selection service 420 may perform the operations of block 810 in a loop until the review selection service 420 determines that the characteristics of the set of reviews have changed.

Accordingly, in response to determining that the characteristics of the set of reviews has changed (e.g., decision block 812="YES"), the review selection service 420 may determine the changed characteristics of the set of reviews, in block 814. As described, the changed characteristics may correspond to changes to the characteristics to one or more reviews in the set of review or to changes to the characteristics of the set of reviews as a whole. For example, the change characteristics of the set of reviews may indicate that additional reviews have been added to the set of reviews. In another example, a changed characteristic of a review may include a revision to the content of the review, such as replaced text, added video or audio, or the like.

In decision block 816, the review selection service 420 may determine, based on the changed characteristics determined in block 814, which of the clustering-selection strategy or the maximum-set-coverage selection strategy is more suitable for selecting a desired number of reviews in the set of reviews. In some embodiments, the review selection service 420 may utilize the changed characteristics of the set of reviews to select one of the maximum-set-coverage selection strategy or the clustering-selection strategy, such as by performing operations similar to the operations described with reference to decision block 804. For example, the review selection service 420 may determine updated selection-strategy scores based on the changed characteristics.

In response to determining that the maximum-set-coverage selection strategy is more suitable for selecting a desired number of reviews in the set (e.g., decision block 816="MAXIMUM SET COVERAGE"), the review selection service 420 may perform the above operations in a loop by selecting a subset of the set of reviews using a maximum-set-coverage selection strategy, in block 808. Alternatively, in response to determining that, based on the change characteristics, the clustering-selection strategy is more suitable for selecting a desired number of reviews in the set of reviews (e.g., decision block 816="CLUSTERING"), the review selection service 420 may repeat the above operations in a loop by selecting another subset of the set of reviews using a clustering-selection strategy, in block 806.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims. Embodiments of the disclosure can be described in view of the following clauses:

Clause 1. A computing system comprising:
- a memory configured to store processor-executable instructions; and
- a processor in communication with the memory and configured to execute the processor-executable instructions to perform operations comprising:
  - receiving, from another computing device, a number of items desired for presentation on the other computing device;
  - deriving an associated collection of elements from the set of items;
  - for each item of the set of items, determining a marginal utility value of the item from a set of elements, in the associated collection of elements, that is related to the item;
  - selecting, from the set of items, a set of representative items based at least in part on the number of items desired for presentation and the marginal utility values of the items in the set of items, wherein the number of items in the set of representative items corresponds to the number of items desired for presentation; and
  - providing the subset of items to the other computing device for presentation via a user interface.

Clause 2. The computing system of clause 1, wherein the operations further comprise ranking the items in the set of representative items.

Clause 3. The computing system of clauses 1-2, wherein an element in the associated collection of elements comprises one of a word, a portion of a word, a token, a type of media, or a characteristic of a user associated with the item.

Clause 4. The computing system of clauses 1-3, wherein the set of items comprises a set of reviews, and wherein the associated collection of elements comprises a plurality of words included in the set of reviews.

Clause 5. A computer-implemented method comprising:
- deriving an associated collection of elements from a set of items;
- for each item of the set of items:
  - identifying an element, in the associated collection of elements, that is related to the item, and
  - determining a marginal utility value for the item based at least in part on the element, in the associated collection of elements, that is related to the item;
- determining, from among the set of items, an item having a highest marginal utility value; and
- modifying, from the associated collection of elements, an element related to the item having the highest marginal utility value.

Clause 6. The computer-implemented method of clause 5, further comprising providing the item having the highest marginal utility value to a computing device for presentation.

Clause 7. The computer-implemented method of clauses 5-6, further comprising, for each item of the set of items, determining an updated marginal utility value for the item based at least in part on a remaining element, in the associated collection of elements, that is related to the item.

Clause 8. The computer-implemented method of clause 7, further comprising:
- determining, from among the set of items, an item having a highest updated marginal utility value; and
- modifying, from the associated collection of elements, an element that is related to the item having the highest updated marginal utility value.

Clause 9. The computer-implemented method of clause 8, further comprising providing the item having the highest marginal utility value and the item having the highest updated marginal utility value to a computing device for presentation.

Clause 10. The computer-implemented method of clauses 5-9, wherein determining the marginal utility value for the item based at least in part on the element, in the associated collection of elements, that is related to the item comprises:
- determining a number of elements included in the associated collection of elements that are related to the item; and
- determining the marginal utility value for the item based at least in part on said number.

Clause 11. The computer-implemented method of clauses 5-10, further comprising determining a weight for each element in the associated collection of elements.

Clause 12. The computer-implemented method of clause 11, wherein a weight of the element, in the associated collection of elements, related to the item is based at least in part on at least one of:
- an amount of space required to display the element on a user interface of a computing device;
- an amount of available space to display the element on the user interface of the computing device;
- a size of the user interface of the computing device; or
- a number of items that are related to the element.

Clause 13. The computer-implemented method of clause 11, wherein determining the marginal utility value for the item based at least in part on the element, in the associated collection of elements, related to the item comprises:
- determining a value of the element;
- determining a weight of the element;
- applying the weight of the element to the value of the element to determine a weighted value of the element; and
- determining the marginal utility value for the item based at least in part on weighted value of the element.

Clause 14. The computer-implemented method of clause 13, further comprising determining an updated weight for each element of a remaining set of elements included in the associated collection of elements in response to modifying the element related to the item having the highest marginal utility value from the associated collection of elements.

Clause 15. A non-transitory, computer-readable medium having stored thereon computer-executable software instructions configured to cause a processor of a computing device to perform operations comprising:
deriving an associated collection of elements from a set of reviews;
for each review of the set of reviews:
identifying an element, in the associated collection of elements, that is related to the review, and
determining a marginal utility value for the review based at least in part on the element, in the associated collection of elements, that is related to the review;
determining, from among the set of reviews, a review having a highest marginal utility value; and
modifying, from the associated collection of elements, an element related to the review having the highest marginal utility value.

Clause 16. The non-transitory, computer-readable medium of clause 15, wherein deriving the associated collection of elements from the set of reviews comprises:
for each review in the set of reviews:
determining a word included in the review,
determining that the word is not included in the associated collection of elements, and
including the word in the associated collection of elements.

Clause 17. The non-transitory, computer-readable medium of clause 16, wherein deriving the associated collection of elements from the set of reviews further comprises:
obtaining a set of common words; and
modifying one or more words included in the set of common words from the associated collection of elements.

Clause 18. The non-transitory, computer-readable medium of clause 15-17, wherein deriving the associated collection of elements from the set of reviews comprises:
for each review in the set of reviews:
parsing the review to identify a token,
determining that the token is not included in the associated collection of elements, and
including the token in the associated collection of elements Clause 19. The non-transitory, computer-readable medium of clauses 15-18, wherein deriving the associated collection of elements from the set of reviews comprises:
determining, from a set of features, a feature that is desired; and
for each review in the set of reviews:
identifying an element, included in the review, that is associated with the feature that is desired;
determining that the element that is associated with the feature that is desired is not included in the associated collection of elements, and
including the elements that is associated with the feature that is desired in the associated collection of elements.

Clause 20. The non-transitory, computer-readable medium of clause 15-19, wherein deriving the associated collection of elements from the set of reviews comprises:
for each review in the set of reviews:
performing at least one of automatic speech recognition or object recognition on the review to identify an element,
determining that the element that is identified is not included in the associated collection of elements, and
including the element that is identified in the associated collection of elements.

Clause 21. The non-transitory, computer-readable medium of clause 15-20, wherein modifying the element related to the review having the highest marginal utility value comprises one of:
removing, from the associated collection of elements, the element related to the review having the highest marginal utility value; or
modifying, in the associated collection of elements, a value of the element related to the review having the highest marginal utility value.

Clause 22. A computing system comprising:
a memory configured to store processor-executable instructions; and
a processor in communication with the memory and configured to execute the processor-executable instructions to perform operations comprising:
receiving, from another computing device, a number of items desired for presentation on the other computing device;
for each item in a set of items:
determining a first set of characteristics of the item, and
generating a multi-dimensional data structure representative of the item based at least in part on the first set of characteristics of the item;
identifying, within the set of items, a set of item clusters based at least in part on the multi-dimensional data structure for each item in the set of items;
for each item cluster in the set of item clusters:
determining, for each item of the item cluster, a second set of characteristics of the item that is distinct from the first set of characteristics,
determining, for each item of the item cluster, a utility value of the item based at least in part on the second set of characteristics;
selecting, from the item cluster, one item having a highest utility value, and
including the one item in a set of selected items; and
providing the set of selected items to the other computing device for presentation via a user interface,
wherein the set of selected items comprises one or more items representative of the set of items.

Clause 23. The computing system of clause 22, wherein the operations further comprise ranking the items in the set of selected items.

Clause 24. The computing system of clauses 22-23, wherein the multi-dimensional data structure representative of the item comprises a feature vector comprising an indexed value for each of the first set of characteristics of the item.

Clause 25. The computing system of clauses 22-24, wherein the first set of characteristics of the item comprises at least one of a word included in the item, a portion of a word included in the item, a token included in the item, a degree of approval of the item, a degree of disapproval of the item, a location of a user associated with the item, a number of items associated with the user, a categorical ranking of the item, or a feature of another item that is related to the item.

Clause 26. A computer-implemented method comprising:
for each item in a set of items:
  determining a first characteristic of the item, and generating a representation of the item based at least in part on the first characteristic;
generating, from the set of items, a plurality of clusters of similar items based at least in part on similarities between representations of items included in the set of items; and
for each cluster in the plurality of clusters of similar items:
  determining, for each item of the cluster, a second characteristic of the item, wherein the second characteristic is distinct from the first characteristic,
  determining, for each item of the cluster, a utility value of the item based at least in part on the second characteristic of the item;
  selecting, from the item cluster, one item based at least in part on a utility value of the one item, and including the one item in a set of selected items,
wherein the set of selected items comprises one or more items representative of the set of items.

Clause 27. The computer-implemented method of clause 26, further comprising providing the set of selected items to a client computing device for presentation via a user interface.

Clause 28. The computer-implemented method of clause 26-27, further comprising:
determining, for each item of the cluster, a weight for the item based at least in part on one or more of:
  an amount of space required to display the item on a user interface of the computing device;
  an amount of available space to display the item on the user interface of the computing device; and
  a size of the user interface of the computing device,
wherein determining the utility value of the item is further based at least in part on the weight for the item.

Clause 29. The computer-implemented method of clauses 26-28, wherein selecting the one item comprises selecting an item having a highest first item value in the cluster as the one item.

Clause 30. The computer-implemented method of clause 26, wherein the first characteristic comprises one of a number of words included in the item, a number of tokens included in the item, or a number of phrases included in the item.

Clause 31. The computer-implemented method of clauses 26-30, further comprising:
for each item included in the set of selected items, determining a second utility value of the item based at least in part on a third characteristic of the item, wherein the third characteristic is distinct from the first characteristic and the second characteristic; and
determining an order of the set of selected items based at least in part on second utility values of items included in the set of selected items.

Clause 32. The computer-implemented method of clause 31, wherein the second utility value of the item comprises a ratio of a number of approvals of the item to a number of disapprovals of the item.

Clause 33. The computer-implemented method of clause 31, wherein further comprising:
generating presentation information comprising the set of selected items and the order of the set of selected items; and
providing the presentation information to a computing device for presentation via a user interface.

Clause 34. A non-transitory, computer-readable medium having stored thereon computer-executable software instructions configured to cause a processor of a computing device to perform operations comprising:
for each item in the set of items:
  determining a first characteristic of the item, and generating a representation of the item based at least in part on the first characteristic;
generating, from the set of items, a plurality of clusters of similar items based at least in part on similarities between representations of items included in the set of items; and
for each cluster in the plurality of clusters of similar items:
  determining, for each item of the cluster, a second characteristic of the item, wherein the second characteristic is distinct from the first characteristic,
  determining, for each item of the cluster, a utility value of the item based at least in part on the second characteristic of the item;
  selecting, from the item cluster, one item based at least in part on a utility value of the one item, and including the one item in a set of selected items,
wherein the set of selected items comprises one or more items representative of the set of items.

Clause 35. The non-transitory, computer-readable medium of clause 34, wherein the operations further comprise providing the set of selected items to a client computing device for presentation via a user interface.

Clause 36. The non-transitory, computer-readable medium of clauses 34-35, wherein the operations further comprise ranking the set of selected items.

Clause 37. The non-transitory, computer-readable medium of clauses 34-36, wherein generating, from the set of items, the plurality of subsets based at least in part on similarities between representations of items included in the set of items comprises identifying clusters of items in the set of items based at least in part on a clustering algorithm and the similarities between the representations of the items included in the set of items.

Clause 38. The non-transitory, computer-readable medium of clause 37, wherein the clustering algorithm comprises one of a hierarchical clustering algorithm, a k-means algorithm, an expectation-maximization algorithm, or a biclustering algorithm.

Clause 39. A computing system comprising:
a memory configured to store processor-executable instructions; and
a processor in communication with the memory and configured to execute the processor-executable instructions to perform operations comprising:
  providing, to a computing device, a request for a plurality of clusters of similar items;
  receiving, from the computing device, the plurality of clusters of similar items, wherein the plurality of clusters of similar items are generated at the computing device from a set of items, a first characteristic, and similarities between representations of items included in the set of items;
for each cluster in the plurality of clusters of similar items:
determining, for each item of the cluster, a second characteristic of the item, wherein the second characteristic is distinct from the first characteristic,
determining, for each item of the cluster, a utility value of the item based at least in part on the second characteristic of the item,
selecting, from the cluster, one item based at least in part on a utility value of the one item, and
including the one item in a set of representative items,
wherein the set of representative items comprises one or more items representative of the set of items.

Clause 40. The computing system of clause 39, wherein:
the second characteristic comprises personalized information of a user of the computing system; and
the personalized information is not available to the other computing device computing device.

Clause 41. The computing system of clause 39-40, wherein the other computing device comprises a network computing device.

Clause 42. A computing system comprising:
a memory configured to store processor-executable instructions; and
a processor in communication with the memory and configured to execute the processor-executable instructions to perform operations comprising:
determining an initial number of items included in a set of items;
selecting, based at least in part on the initial number of items included in the set of items, one of a clustering-selection strategy or a maximum-set-coverage selection strategy as a first item selection strategy;
selecting a first subset of the set of items using the first item selection strategy;
providing the first subset of items to another computing device for presentation via a user interface;
determining that a change in the initial number of items included in the set of items has occurred;
determining an updated number of items included in the set of items from the change in the initial number of items;
identifying, based at least in part on the updated number of items, one of the clustering-selection strategy or the maximum-set-coverage selection strategy as a second item selection strategy; and
selecting a second subset of the set of items using the second item selection strategy.

Clause 43. The computing system of clause 42, wherein selecting the first item selection strategy comprises:
determining that the initial number of items included in the set of items satisfies a threshold number of items; and
selecting the clustering-selection strategy as the first item selection strategy.

Clause 44. The computing system of clause 42, wherein selecting the first item selection strategy further comprises:
determining that the initial number of items included in the set of items does not satisfy a threshold number of items; and
selecting the maximum-set-coverage selection strategy as the first item selection strategy.

Clause 45. A computer-implemented method comprising:
determining, at a first computing device, an initial characteristic of a set of items;
selecting, based at least in part on the initial characteristic of the set of items, at least one of a first selection strategy and a second selection strategy as a first item selection strategy, at the first computing device;
selecting, at the first computing device, a first subset of the set of items using the first item selection strategy;
determining, at the first computing device, a change in the initial characteristic of the set of items;
identifying, at the first computing device and based at least in part on the change in the initial characteristic of the set of items, at least one of the first selection strategy and the second selection strategy as a second item selection strategy, at the first computing device; and
selecting, at the first computing device, a second subset of the set of items using the second item selection strategy.

Clause 46. The computer-implemented method of clause 45, further comprising:
providing the first subset of items to a second computing device for presentation on a user interface; and
providing the second subset of items to at least one of the second computing device or a third computing device.

Clause 47. The computer-implemented method of clauses 45-46, wherein:
selecting, at the first computing device, the first subset of the set of items using the first item selection strategy comprises:
providing the set of items and the initial characteristic to a second computing device, and
receiving, from the second computing device, the first subset of the set of items selected using the first item selection strategy.

Clause 48. The computer-implemented method of clause 45-47, wherein selecting a first subset of the set of items using the first item selection strategy comprises:
generating an associated collection of elements from the set of items;
for each item of the set of items:
identifying an element, in the associated collection of elements, that is related to the item, and
determining a marginal utility value for the item based at least in part on the element, in the associated collection of elements, that is related to the item; and
selecting the first subset of items from the set of items based at least in part on a number of items that is desired and a marginal utility value of each item of the set of items.

Clause 49. The computer-implemented method of clause 48, wherein determining the marginal utility value for the item based at least in part on the element, in the associated collection of elements, that is related to the item comprises:
determining a number of elements included in the associated collection of elements that are related to the item; and
determining the marginal utility value for the item based at least in part on said number.

Clause 50. The computer-implemented method of clause 48-49, wherein selecting the first subset of items from the set of items based at least in part on the number of items that is desired and the marginal utility value of each item of the set of items comprises:
  determining, from among the set of items, an item having a highest marginal utility value; and
  removing, from the associated collection of elements, an element related to the item having the highest marginal utility value.

Clause 51. The computer-implemented method of clause 50 further comprising determining an updated marginal utility value for each item of the set of items based at least in part on the element that was removed from the associated collection of elements.

Clause 52. The computer-implemented method of clause 45, wherein selecting the second subset of the set of items using the second item selection strategy comprises:
  for each item in the set of items:
    determining a first characteristic of the item, and
    generating a representation of the item based at least in part on the first characteristic;
  generating, from the set of items, a plurality of clusters based at least in part on similarities between representations of items included in the set of items; and
  selecting the second subset of items, wherein the second subset of items comprises one item from each of the plurality of subsets of items.

Clause 53. The computer-implemented method of clause 52, wherein the utility value of the item comprises a ratio of a number of approvals of the item to a number of disapprovals of the item.

Clause 54. The computer-implemented method of clauses 52-53, wherein selecting the second subset of items, wherein the second subset of items comprises one item from each of the plurality of subsets of items comprises:
  for each cluster in the plurality of clusters of similar items:
    determining, for each item of the cluster, a second characteristic of the item, wherein the second characteristic is distinct from the first characteristic,
    determining, for each item of the cluster, a utility value of the item based at least in part on the second characteristic of the item;
    selecting, from the item cluster, one item based at least in part on a utility value of the one item, and
    including the one item in a set of selected items.

Clause 55. The computer-implemented method of clause 54, wherein selecting, from the item cluster, the one item based at least in part on a utility value of the one item comprises selecting, from the cluster, an item having a highest utility value as the one item.

Clause 56. A non-transitory, computer-readable medium having stored thereon computer-executable software instructions configured to cause a processor of a computing device to perform operations comprising:
  determining an initial characteristic of a set of items;
  selecting, based at least in part on the initial characteristic of the set of items, at least one of a first selection strategy and a second selection strategy as a first item selection strategy;
  selecting a first subset of the set of items using the first item selection strategy;
  determining a change in the initial characteristic of the set of items;
  identifying, based at least in part on the change in the initial characteristic of the set of items, at least one of the first selection strategy and the second selection strategy as a second item selection strategy; and
  selecting a second subset of the set of items using the second item selection strategy.

Clause 57. The non-transitory, computer-readable medium of clause 56, wherein:
  the initial characteristic comprises a number of items included in the set of items; and
  selecting the first item selection strategy is based at least in part on the number of items included in the set of items.

Clause 58. The non-transitory, computer-readable medium of clauses 56-57, wherein:
  the initial characteristic comprises a content-based characteristic of the set of items and a contextual characteristic of the set of items; and
  determining the initial characteristic of a set of items comprises:
    determining a first selection-strategy score based at least in part on the content-based characteristic of the set of items, and
    determining a second selection-strategy score based at least in part on the contextual characteristic of the set of items.

Clause 59. The non-transitory, computer-readable medium of clause 56-58, wherein selecting the first item selection strategy comprises determining that the first selection-strategy score is greater than or equal to the second selection-strategy score.

Clause 60. The non-transitory, computer-readable medium of clause 58, wherein determining the change in the initial characteristic of the set of items comprises:
  determining an updated content-based characteristic of the set of items based at least in part on the change in the initial characteristic of the set of items;
  determining an updated contextual characteristic of the set of items based at least in part on the change in the initial characteristic of the set of items;
  determining a first updated selection-strategy score based at least in part on the updated content-based characteristic of the set of items; and
  determining a second updated selection-strategy score based at least in part on the updated contextual characteristic of the set of items.

Clause 61. The non-transitory, computer-readable medium of clause 60, wherein identifying the second item selection strategy based at least in part on the change in the initial characteristic of the set of items comprises determining that the second updated selection-strategy score is greater than or equal to the first updated selection-strategy score.

All such modifications and variations are intended to be included herein within the scope of this disclosure and protected by the following claims.

What is claimed is:

1. A computing system comprising:
  a memory configured to store processor-executable instructions; and
  a processor in communication with the memory and configured to execute the processor-executable instructions to perform operations comprising:
    determining an initial number of reviews of an item included in a set of reviews of the item, wherein the initial number is indicative of the number of reviews initially included in the set of reviews;

selecting, based at least in part on the initial number of reviews, one of a clustering-selection strategy or a maximum-set-coverage selection strategy as a first review selection strategy;

selecting a first subset of the set of reviews using the first review selection strategy;

providing the first subset of reviews to another computing device for presentation via a user interface;

determining that a change in the initial number of reviews has occurred;

determining an updated number of reviews included in the set of reviews based at least in part on determining that a change in the initial number of reviews has occurred;

identifying, based at least in part on the updated number of items, one of the clustering-selection strategy or the maximum-set-coverage selection strategy as a second review selection strategy; and selecting a second subset of the set of reviews using the second review selection strategy.

2. The computing system of claim 1, wherein selecting the first review selection strategy comprises:

determining that the initial number of reviews satisfies a threshold number of reviews; and selecting the clustering-selection strategy as the first review selection strategy.

3. The computing system of claim 1, wherein selecting the first review selection strategy further comprises:

determining that the initial number of reviews does not satisfy a threshold number of review; and selecting the maximum-set-coverage selection strategy as the first review selection strategy.

4. A computer-implemented method comprising:

determining, at a first computing device, an initial characteristic of a set of reviews of an item;

identifying, at the first computing device, a first selection strategy and a second selection strategy distinct from the first selection strategy;

selecting, based at least in part on the initial characteristic of the set of reviews of the item, at least one of the first selection strategy and the second selection strategy as a first review selection strategy, at the first computing device;

selecting, at the first computing device, a first subset of the set of reviews using the first review selection strategy;

determining, at the first computing device, a change in the initial characteristic of the set of reviews;

identifying, based at least in part on the change in the initial characteristic of the set of reviews, at least one of the first selection strategy and the second selection strategy as a second review selection strategy, at the first computing device; and selecting, at the first computing device, a second subset of the set of reviews using the second item selection strategy.

5. The computer-implemented method of claim 4, further comprising:

providing the first subset of reviews to a second computing device for presentation on a user interface; and providing the second subset of reviews to at least one of the second computing device or a third computing device.

6. The computer-implemented method of claim 4, wherein:

selecting, at the first computing device, the first subset of the set of reviews using the first review selection strategy comprises:

providing the set of reviews and the initial characteristic to a second computing device, and receiving, from the second computing device, the first subset of the set of reviews selected using the first review selection strategy.

7. The computer-implemented method of claim 4, wherein selecting a first subset of the set of reviews using the first review selection strategy comprises:

generating an associated collection of elements from the set of items;

for each review of the set of reviews:

identifying an element, in the associated collection of elements, that is related to the review, and determining a marginal utility value for the review based at least in part on the element, in the associated collection of elements, that is related to the review; and selecting the first subset of items from the set of reviews based at least in part on a number of reviews that is desired and the marginal utility value of each review of the set of reviews.

8. The computer-implemented method of claim 7, wherein determining the marginal utility value for the review based at least in part on the element, in the associated collection of elements, that is related to the review comprises:

determining a number of elements included in the associated collection of elements that are related to the review; and determining the marginal utility value for the item based at least in part on said number.

9. The computer-implemented method of claim 7, wherein selecting the first subset of reviews from the set of reviews based at least in part on the number of reviews that is desired and the marginal utility value of each review of the set of reviews comprises:

determining, from among the set of reviews, an item having a highest marginal utility value; and removing, from the associated collection of elements, an element related to the review having the highest marginal utility value.

10. The computer-implemented method of claim 9, further comprising determining an updated marginal utility value for each review of the set of reviews based at least in part on the element that was removed from the associated collection of elements.

11. The computer-implemented method of claim 4, wherein selecting the second subset of the set of reviews using the second item selection strategy comprises:

for each item in the set of reviews:

determining a first characteristic of the review, and generating a representation of the review based at least in part on the first characteristic;

generating, from the set of reviews, a plurality of clusters based at least in part on similarities between representations of reviews included in the set of reviews; and selecting the second subset of reviews, wherein the second subset of reviews comprises one reviews from each of the plurality of subsets of reviews.

12. The computer-implemented method of claim 11, wherein the utility value of the review comprises a ratio of a number of approvals of the review to a number of disapprovals of the review.

13. The computer-implemented method of claim 11, wherein selecting the second subset of reviews, wherein the second subset of items comprises one review from each of the plurality of subsets of reviews comprises:

for each cluster in the plurality of clusters of similar reviews:
  determining, for each review of the cluster, a second characteristic of the review, wherein the second characteristic is distinct from the first characteristic,
  determining, for each review of the cluster, a utility value of the review based at least in part on the second characteristic of the review;
  selecting, from the review cluster, one item based at least in part on a utility value of the one review, and including the one review in a set of selected reviews.

14. The computer-implemented method of claim 13, wherein selecting, from the item cluster, the one review based at least in part on a utility value of the one review comprises selecting, from the cluster, a review having a highest utility value as the one review.

15. The computer-implemented method of claim 4, wherein an item comprises at least one of a good, product, object or service.

16. A non-transitory, computer-readable medium having stored thereon computer-executable software instructions configured to cause a processor of a computing device to perform operations comprising:
  determining an initial characteristic of a set of reviews of an item;
  identifying a first selection strategy and a second selection strategy distinct from the first selection strategy;
  selecting, based at least in part on the initial characteristic of the set of reviews of the item, at least one of the first selection strategy and the second selection strategy as a first review selection strategy;
  selecting a first subset of the set of reviews using the first review selection strategy;
  determining a change in the initial characteristic of the set of reviews;
  selecting, based at least in part on the change in the initial characteristic of the set of reviews, at least one of the first selection strategy and the second selection strategy as a second review selection strategy; and
  selecting a second subset of the set of reviews using the second review selection strategy.

17. The non-transitory, computer-readable medium of claim 16, wherein:
  the initial characteristic comprises a number of reviews included in the set of reviews; and
  selecting the first review selection strategy is based at least in part on the number of reviews included in the set of reviews.

18. The non-transitory, computer-readable medium of claim 16, wherein:
  the initial characteristic comprises a content-based characteristic of the set of reviews and a contextual characteristic of the set of reviews; and
  determining the initial characteristic of a set of reviews comprises:
    determining a first selection-strategy score based at least in part on the content-based characteristic of the set of reviews, and
    determining a second selection-strategy score based at least in part on the contextual characteristic of the set of reviews.

19. The non-transitory, computer-readable medium of claim 18, wherein selecting the first review selection strategy comprises determining that the first selection-strategy score is greater than or equal to the second selection-strategy score.

20. The non-transitory, computer-readable medium of claim 18, wherein determining the change in the initial characteristic of the set of reviews comprises:
  determining an updated content-based characteristic of the set of reviews based at least in part on the change in the initial characteristic of the set of reviews;
  determining an updated contextual characteristic of the set of reviews based at least in part on the change in the initial characteristic of the set of reviews;
  determining a first updated selection-strategy score based at least in part on the updated content-based characteristic of the set of reviews; and
  determining a second updated selection-strategy score based at least in part on the updated contextual characteristic of the set of reviews.

21. The non-transitory, computer-readable medium of claim A, wherein identifying the second review selection strategy based at least in part on the change in the initial characteristic of the set of reviews comprises determining that the second updated selection-strategy score is greater than or equal to the first updated selection-strategy score.

\* \* \* \* \*

UNITED STATES PATENT AND TRADEMARK OFFICE
CERTIFICATE OF CORRECTION

PATENT NO. : 10,114,887 B1
APPLICATION NO. : 15/162437
DATED : October 30, 2018
INVENTOR(S) : Weiwei Cheng Page 1 of 1

It is certified that error appears in the above-identified patent and that said Letters Patent is hereby corrected as shown below:

In the Specification

In Column 33, Line 36 (Approx.), change "PSUEDO" to --PSEUDO--.

In Column 34, Line 11, change "PSUEDO" to --PSEUDO--.

In Column 43, Line 48, change "elements" to --elements.--.

In the Claims

In Column 52, Line 58, Claim 11, change "one reviews" to --one review--.

In Column 54, Line 40 (Approx.), Claim 21, change "claim A," to --claim 20,--.

Signed and Sealed this
Nineteenth Day of February, 2019

Andrei Iancu
*Director of the United States Patent and Trademark Office*